United States Patent
Barth et al.

(10) Patent No.: US 11,633,826 B2
(45) Date of Patent: Apr. 25, 2023

(54) HAND-HELD MACHINE TOOL HAVING A SUCTION HOSE

(71) Applicant: Festool GmbH, Wendlingen (DE)

(72) Inventors: Volker Barth, Aichwald (DE); Nicolai Knecht, Pliezhausen (DE)

(73) Assignee: Festool GmbH, Wendlingen (DE)

( * ) Notice: Subject to any disclaimer, the term of this patent is extended or adjusted under 35 U.S.C. 154(b) by 1154 days.

(21) Appl. No.: 16/090,714

(22) PCT Filed: Apr. 10, 2017

(86) PCT No.: PCT/EP2017/058506
§ 371 (c)(1),
(2) Date: Oct. 2, 2018

(87) PCT Pub. No.: WO2017/178409
PCT Pub. Date: Oct. 19, 2017

(65) Prior Publication Data
US 2019/0160622 A1 May 30, 2019

(30) Foreign Application Priority Data
Apr. 11, 2016 (DE) .......................... 102016106556.0

(51) Int. Cl.
*B24B 7/18* (2006.01)
*B24B 55/10* (2006.01)
(Continued)

(52) U.S. Cl.
CPC .............. *B24B 7/184* (2013.01); *B24B 47/12* (2013.01); *B24B 55/10* (2013.01); *B24B 55/102* (2013.01); *B23Q 11/0046* (2013.01)

(58) Field of Classification Search
CPC ........... B24B 7/184; B24B 7/18; B24B 7/182; B24B 7/186; B24B 47/12; B24B 55/10;
(Continued)

(56) References Cited

U.S. PATENT DOCUMENTS

| 4,782,632 A | 11/1988 | Matechuk |
| 2008/0085664 A1* | 4/2008 | Weiford .................. B25G 1/04 451/259 |

(Continued)

FOREIGN PATENT DOCUMENTS

| CN | 201376211 Y | * 1/2010 |
| CN | 201376211 Y | 1/2010 |

(Continued)

OTHER PUBLICATIONS

German Search Report dated Jan. 24, 2017.

*Primary Examiner* — Don M Anderson
*Assistant Examiner* — Caleb Andrew Holizna
(74) *Attorney, Agent, or Firm* — Hoffmann & Baron, LLP

(57) ABSTRACT

A hand-held machine tool having a, in particular rod-shaped, handle element for an operator to grasp and having a machining head, which is movably mounted on the handle element by means of a joint assembly and which has an electric drive motor for driving a tool holder for holding a machining tool, wherein a bottom side of the handle element and a machining side of the machining head face a workpiece in a base position of the machining head, wherein the joint assembly is connected to the machining head in an articulated-connection region of the machining head, wherein a flexible suction hose for conducting a suction flow from the machining head to the handle element extends between the handle element and the machining head, which suction hose is fastened to an end region of the handle element by means of a first hose end and to a suction connection of the machining head by means of a second hose end.

18 Claims, 7 Drawing Sheets

(51) Int. Cl.
*B24B 47/12* (2006.01)
*B23Q 11/00* (2006.01)

(58) Field of Classification Search
CPC ....... B24B 55/102; B24B 55/06; B24B 23/02; B23Q 11/0046
USPC .................................. 451/353, 354, 359, 456
See application file for complete search history.

(56) References Cited

U.S. PATENT DOCUMENTS

2011/0183587 A1\* 7/2011 Roscher .................... B24B 7/18
451/439
2016/0184954 A1\* 6/2016 Roeck .................... B24B 55/10
451/344

FOREIGN PATENT DOCUMENTS

| | | |
|---|---|---|
| CN | 203527181 U | 4/2014 |
| DE | 102007010195 B3 | 4/2008 |
| DE | 102007012394 A1 | 9/2008 |
| DE | 102008055797 A1 | 5/2010 |
| DE | 102013213271 A1 | 1/2015 |
| EP | 1964644 A1 | 9/2008 |
| EP | 1970168 | 9/2008 |
| JP | 2000-202752 A | 7/2000 |

\* cited by examiner

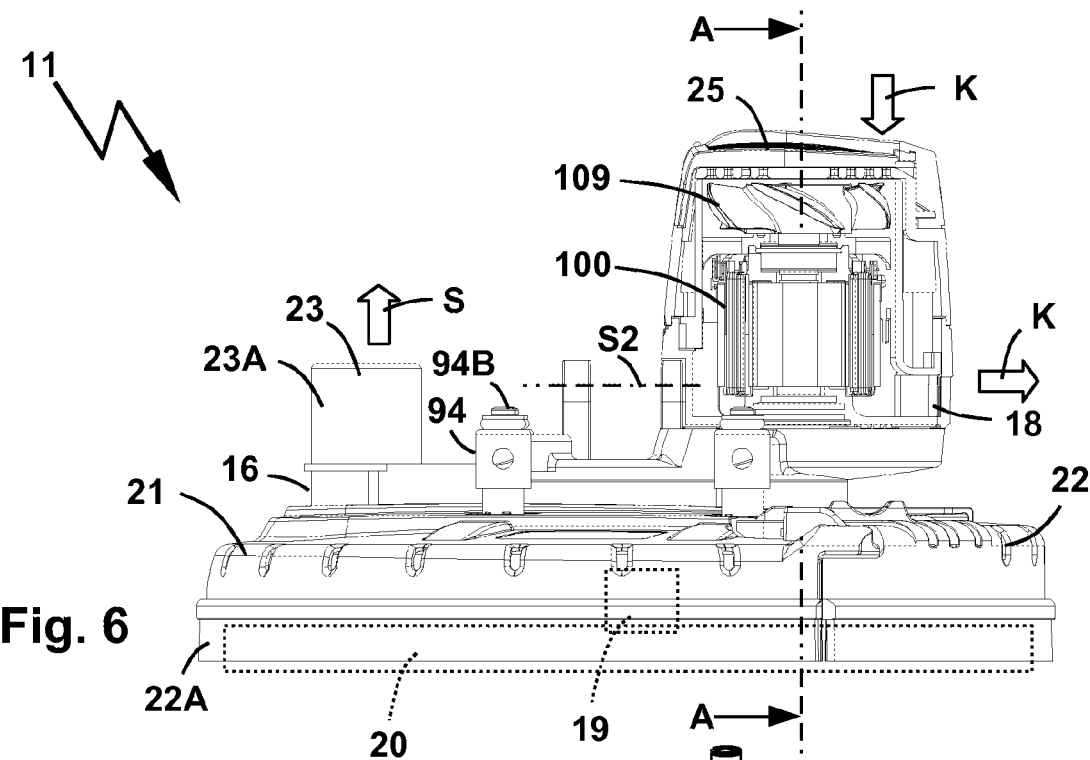
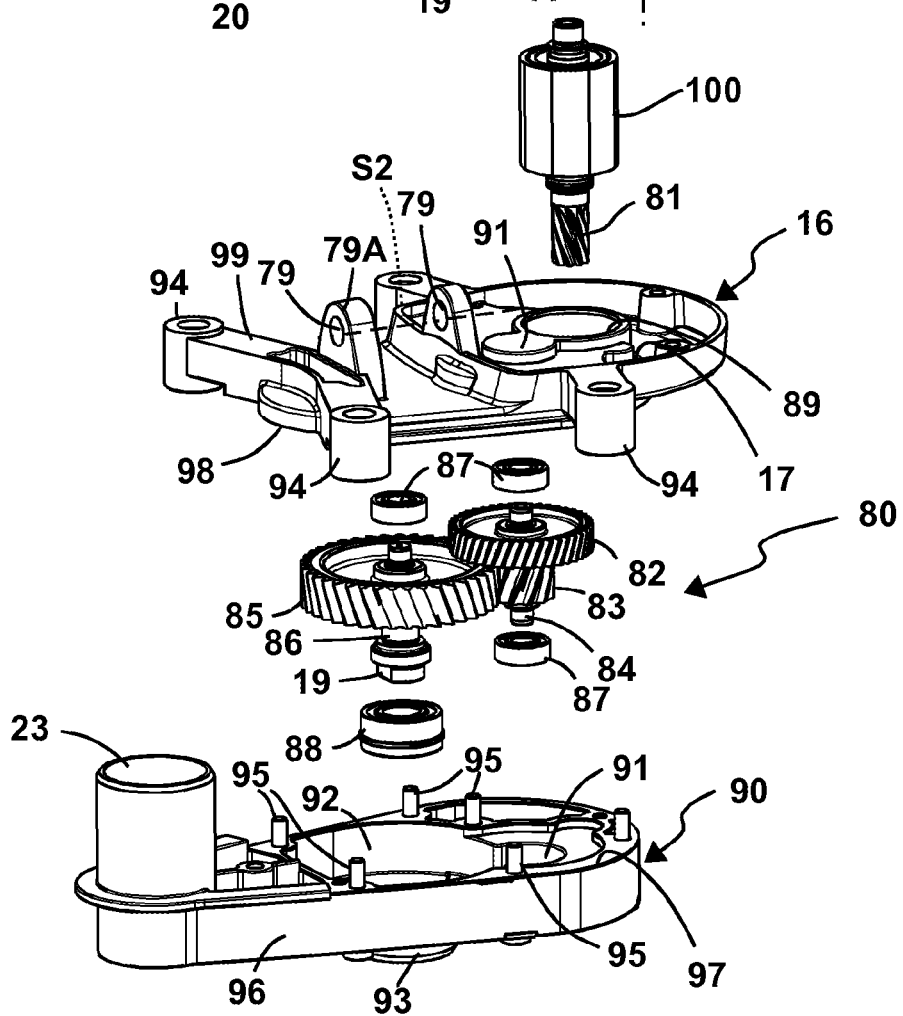

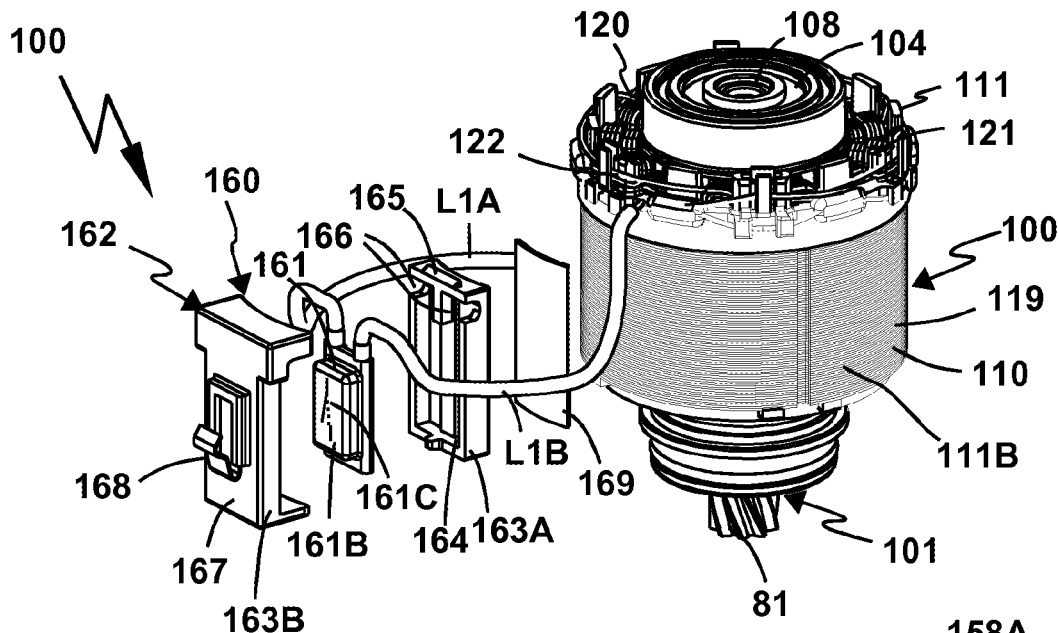
Fig. 10
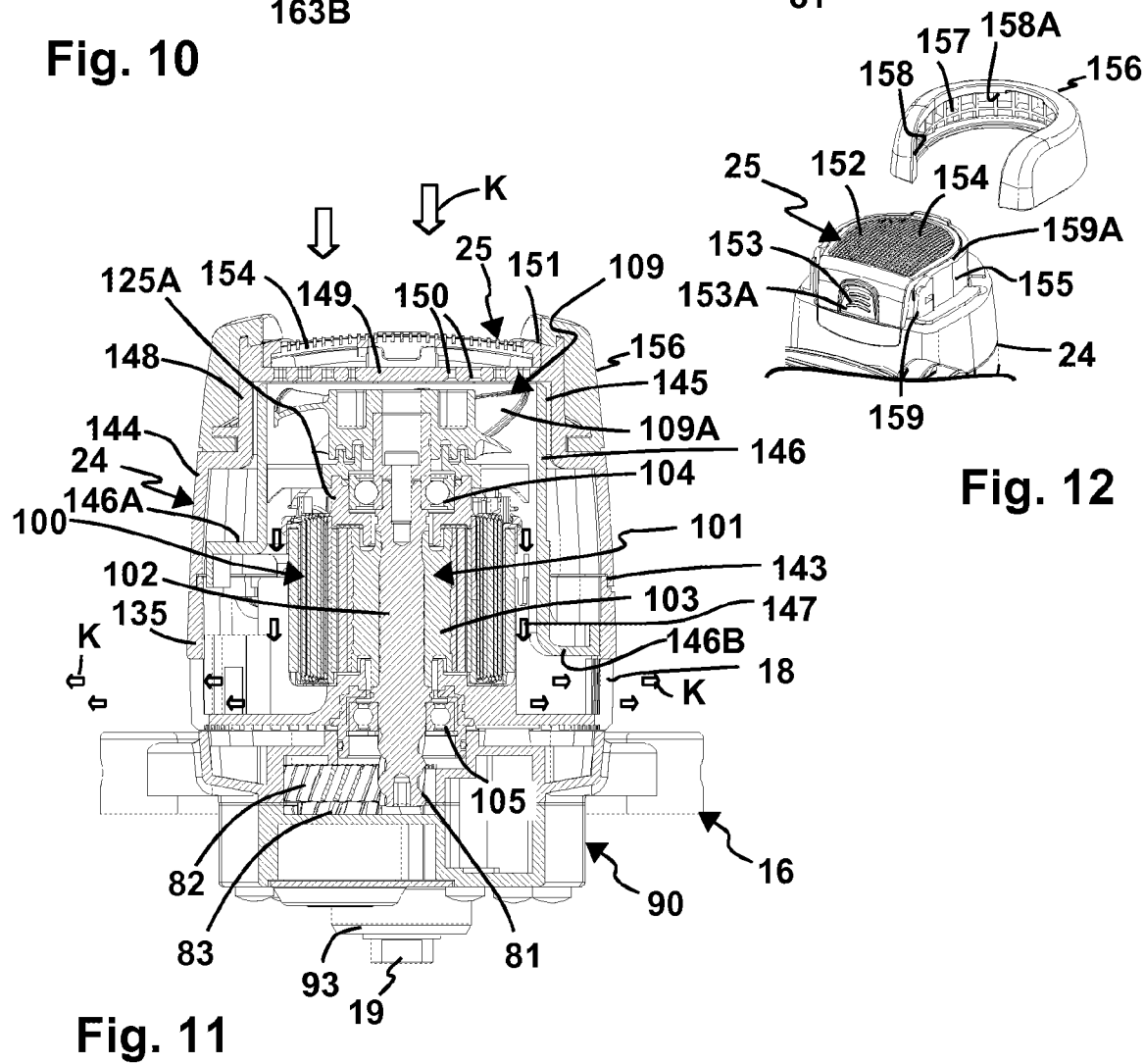
Fig. 11
Fig. 12

HAND-HELD MACHINE TOOL HAVING A SUCTION HOSE

This application claims priority based on an International Application filed under the Patent Cooperation Treaty, PCT/EP2017/058506, filed Apr. 10, 2017, which claims priority to DE 10 2016 106 556.0, filed Apr. 11, 2016.

BACKGROUND OF THE INVENTION

The invention relates to a hand-held machine tool, in particular a sanding machine, having an, in particular rod-shaped handle element for an operator to grasp and having a machining head which is movably mounted on the handle element by means of a joint assembly and which has an electric drive motor for driving a tool holder for holding a machining tool, wherein a bottom side of the handle element and a machining side of the machining head face a workpiece in a base position of the machining head, wherein the joint assembly is connected to the machining head in an articulated-connection region of the machining head, wherein a flexible suction hose for conducting a suction flow from the machining head to the handle element extends between the handle element and the machining head, which suction hose is fastened to an end region of the handle element by means of a first hose end and to a suction connection of the machining head by means of a second hose end.

Such a hand-held machine tool in the form of a sanding machine is, by way of example, described in DE 10 2007 012 394 A1. The machining head in the form of a sanding head can pivot in a gimballed manner relative to the rod-shaped handle element forming a grip rod, so that the operator is able to conveniently guide the sanding head along the wall surfaces, in order to sand these.

However, the operation of such a sanding machine is in many cases inconvenient. In particular, in many work situations the positioning of the machining head or sanding head relative to the wall surface is difficult due to the long grip rod.

SUMMARY OF THE INVENTION

Hence, the object of the present invention is to provide an improved hand-held machine tool, in particular a sanding machine.

To achieve this object, on a hand-held machine tool of the abovementioned type it is provided that the suction connection is arranged between the end region of the handle element and the articulated-connection region of the machining head in the base position.

On its bottom side, the handle element can have an elongated design and/or a bottom side surface at least extending along a longitudinal axis. The machining side of the machining head is preferably elongated and/or has a machining surface extending along a longitudinal axis. Preferably, on the machining side of the machining head a machining surface is provided, by way of example a sanding surface, polishing surface or cleaning surface.

The base position may be a single relative position of the machining head and the handle element. However, it is preferred if the base position forms part of a basic working area or of a base position area containing at least one or more base positions. In the basic working area, that is to say in a larger area, by way of example a pivot area and/or sliding area of the machining head and the handle element relative to one another, the bottom side of the handle element and the machining side of the machining head are, so to speak, arranged on the same side of the hand-held machine tool. This will be made clearer, by way of example, by the following explanations:

The machining head can be guided from the base position, by way of example, by pivoting and/or sliding. It is, by way of example, possible for a bottom side surface of the handle element and a machining surface provided on the machining side of the machining head to be in a position where they are parallel or approximately parallel to one another. Approximately parallel is intended to mean a small angular range of a maximum of 10°, in particular a maximum of 5° or 3°, from a position in which the bottom side surface and the machining surface are exactly parallel. The parallel position can be the corresponding base position. But it is also possible for the base position to form part of a basic working area, by way of example a pivot area. Thus, the machining surface may, by way of example, pivot from the parallel position in at least one direction, by way of example towards the bottom side of the handle element and/or away from the bottom side of the handle element.

In other words, it is thus perfectly possible for a machining surface on the machining side, for example a sanding surface or polishing surface, to be passed through by a longitudinal axis of the handle element approximately at right angles, in particular in a range of 80-120°.

Thus, in the base position or the basic working area, the suction hose extends precisely not to a front area of the machining head facing away from the handle element across the articulated-connection region. The suction hose can be shorter. The suction hose is better protected from damage. The suction hose is thus preferably not arranged on a front, free end region of the machining head facing away from the handle element, but on a rear area of the machining head associated with the handle element.

A favourable arrangement provides that the suction hose runs, protected at least in sections, next to a support arm, which protrudes from the handle element and on which the machining head is held. Consequently, a free section of the suction hose which, by way of example, does not run in a tube or other profile element of the handle element, is arranged next to the support arm and is consequently protected. A convenient arrangement is one with a plurality of support arms, by way of example two support arms, as also implemented in the following exemplary embodiment.

It is expediently provided that on the end region of the handle element holding the machining head a fork is arranged, having fork arms, on which the machining head is held and between which or next to which the suction hose runs. Thus it is preferred to arrange the suction hose in a gap between the fork arms. But it is also possible for the suction hose to be arranged laterally next to the fork arms, outside the gap between the fork arms. The fork arms protect the suction hose from damage. But it is also possible for sections of the suction hose to nevertheless protrude upwards or downwards from the fork arms, by way of example from a gap between the fork arms. The fork arms are by way of example support arms.

It is possible that a section or a plurality of sections of the suction hose, by way of example, protrude upwards or downwards in front of the fork arms or the aforementioned support arm or the fork arms. By way of example, in the base position of the machining head the suction hose has a curved section, which protrudes in front of a side of the support arm or the fork arms. Another section of the suction hose protruding on another side, by way of example downwards, in front of the fork arms or the support arm mentioned is, by way of example, connected with the suction connection of the machining head.

An advantageous embodiment of the invention provides that the suction hose is immobilised on the end region of the handle element and/or on the suction connection in a tensile-resistant or slip-resistant manner, or both. An advantageous configuration is one in which the suction hose, by way of example, is rotatable in relation to the handle element or the suction connection. This can improve the degree of freedom or mobility of the machining head.

However, through the favourable course of the suction hose between the articulated-connection region of the machining head and the handle element, there is also a high degree of mobility of the machining head relative to the handle element if the suction hose is immobilised on the machining head and/or on the handle element so that it cannot move.

The suction hose expediently comprises rubber and/or elastomer. The suction hose can be provided with a ribbing or other reinforcement, by way of example a helical reinforcement or a supporting ring.

It is preferred if the suction hose is connected with the handle element in alignment to a longitudinal axis or direction of longitudinal extension of the handle element. It is furthermore advantageous if the suction hose, by way of example, is immobilised on the machining head at right angles to a machining plane or sanding plane of the machining tool or in a different formulation running parallel to an axis of rotation of the tool holder. Thus, it is advantageously provided that a longitudinal axis of the first hose end of the suction hose extending approximately in the direction of flow of the suction flow is aligned to a longitudinal axis of the handle element extending along a longitudinal extension of the handle element and/or a longitudinal axis of the second hose end of the suction hose extending approximately in the direction of flow of the suction flow approximately parallel to an axis of rotation of the tool holder or approximately at right angles to a machining plane or sanding plane of the machining tool on the machining head.

The following measure can help to increase flexibility. It is advantageously provided that the suction hose has two opposing curved sections between the handle element and the suction connection of the machining head. The preferably provided curved sections of the suction hose run in opposite directions between handle element and suction connection. By way of example, the suction hose can follow the path of a question mark or S-curve. This curved path can be provided in any position of the machining head relative to the handle element. But it is also possible for such a curved path only to be provided in predefined positions of the machining head relative to the handle element, by way of example in a base position or starting position, which the machining head adopts when it is not loaded by an external force.

An advantageous embodiment provides that the articulated-connection region of the machining head is provided between the suction connection and the drive motor. In this way, a particularly favourable weight distribution is achieved. The machining head is loaded by the suction hose on the one hand and by the drive motor on the other. The suction hose can help with counterbalancing. The suction hose can, by way of example, compensate for a force component, by which the machining head supports itself on the handle element. The suction hose can help with balancing the machining head in relation to the handle element. Furthermore, with this configuration or by means of it, it may also arise that the suction hose does not run across the drive motor in the base position of the machining head.

The machining tool has, by way of example, a circular outer periphery contour and/or expediently a circular machining side or machining surface.

It is preferably provided that the suction connection is arranged outside of a centre of the machining head and/or of the machining tool. By way of example, the suction connection is arranged outside of a circle centre of a substantially or exactly circular outer periphery contour of the machining head.

The suction connection is advantageously arranged eccentrically, in particular as eccentrically as possible.

The suction connection is preferably arranged in an edge region or outer circumferential area of the machining head, by way of example a motor housing or an extraction hood of the machining head.

The hand-held machine tool preferably has a grip rod with a longitudinal axis or comprises such a grip rod, wherein in the connection area with the end region of the handle element the suction hose runs along this longitudinal axis. A flexible suction hose may, by way of example, be arranged on the grip rod. But it is also possible for the handle element to have a rigid tubular body, in which a suction channel having a flow connection with the suction hose runs to the machining head. The tubular body can, by way of example, have the design of a section tube, in particular a rigid section tube. In this case, the tubular body is suited to grasping by the operator. Consequently, the section tube forms a support body or a weight-bearing component of the handle element.

The handle element expediently has at least one suction channel, running in the direction of a longitudinal axis of the handle element, and opening out at its end region of the handle element facing towards the machining head on the front face from the handle element. There the suction hose is connected with the suction channel towards the machining head.

However, it is preferred if the handle element at least on its end region facing towards the machining head is designed as a suction pipe or has a suction pipe. The suction hose leading to the machining head is connected to this suction pipe.

It is advantageously provided that the machining head is loaded by a positioning spring arrangement that is separate from the line arrangement relative to the handle element in the base position.

However, in connection with the positioning spring arrangement, it is further mentioned that an independent invention per se is represented by a hand-held machine tool, in particular a sanding machine, having a, in particular rod-shaped handle element, for an operator to grasp and having a machining head which is movably mounted on the handle element by means of a joint assembly, which has a tool holder for holding a machining tool which is drivable by an electric drive motor of the hand-held machine tool in particular arranged on the machining head, wherein between the handle element and the machining head a line arrangement for transferring electrical and/or mechanical energy and/or and to conduct a suction flow is present, wherein on the hand-held machine tool it is provided that the machining head is loaded by a positioning spring arrangement separate from the line arrangement in a predefined base position relative to the handle element.

The advantage of this concept is that the sanding head or machining head is loaded in a starting position or base position by the positioning spring arrangement, so that it takes a defined, but flexible, position relative to the handle element. Starting from this base position, the operator is able to easily position the machining head relative to the wall surface. Sanding is then an easy task.

If a plurality of suction hoses or other lines, by way of example drive shafts, of the line arrangement are provided, by way of example two suction hoses, the positioning spring arrangement is separate from all suction hoses. A positioning spring arrangement is thus advantageously intended to mean a dedicated spring arrangement for cushioning or spring loading of the machining head relative to the handle element in the base position.

Therefore, an embodiment of the invention expediently provides that the positioning spring arrangement comprises at least one leg spring. But it is also possible for the positioning spring arrangement to comprise a rubber buffer and/or a plastic buffer. A helical spring is also a possible further component of the positioning spring arrangement. Any number of combinations are perfectly conceivable, that is to say that by way of example a leg spring strikes a rubber buffer or plastic buffer, so that the spring effects are added together. But a rubber buffer parallel to a helical spring can also be effective.

The positioning spring arrangement yields when the substrate or a workpiece surface is machined, so that the operator can conveniently guide the machining head along the workpiece surface.

The machining head adopts the base position, when it is not loaded by external forces, by way of example through the effect of an operator or a force effect which, by way of example, causes a reaction from the workpiece onto the hand-held machine tool.

The positioning spring arrangement is preferably arranged away from the line arrangement. It is preferred if the positioning spring arrangement does not impact directly on the line arrangement and/or impacts separately from the line arrangement on the machining head.

The positioning spring arrangement expediently does not have a direct force engagement with the line arrangement.

The positioning spring arrangement is advantageously not passed through by the line arrangement.

The positioning spring arrangement is expediently spatially separated from the line arrangement.

The positioning spring arrangement advantageously does not impact via the line arrangement, in particular not via a suction tube, on the machining head.

The drive motor is preferably arranged directly on the machining head.

It is advantageous if a gear unit is arranged directly on the machining head, via which the tool holder is driven. The gear unit can, by way of example, comprise or be an eccentric gear unit and/or a variable speed gear unit, in particular which reduces the speed of the drive motor, in particular a toothed gear unit and/or a gear unit generating a hypercycloid movement of the tool holder.

It is also possible for the drive motor, by way of example, to be arranged on the handle element and via a power transmission arrangement, by way of example a drive shaft, to drive the tool holder on the machining head directly or via a gear unit, in particular a gear unit arranged on the machining head. By way of example, the power transmission arrangement comprises a flexurally flexible power transmission arrangement, in particular for transmission of a rotary motion of the drive motor to the tool holder or an upstream gear unit. This power transmission element expediently forms a component of the line arrangement.

The positioning spring arrangement can be associated with one or more degrees of freedom of movement of the machining head relative to the handle element or be effective in relation to one of more degrees of freedom of movement. Thus, by way of example, it is possible that the base position of the machining head is only adjustable in relation to one degree of freedom of movement, in particular a degree of freedom of pivoting movement or rotational degree of freedom, whereas at least one other degree of freedom of movement, by way of example at least one translational degree of freedom and/or at least one rotational degree of freedom, is unaffected by the positioning spring arrangement.

A respective positioning spring is supported on the one hand on a component that is immovably or movably connected to the handle element and on the other by a component that is movably or immovably connected to the machining head.

At this point it is mentioned that obviously in the event of several degrees of freedom, that the machining head has relative to the handle element, by way of example when there is a plurality of pivot axes and/or when there is a combination of a pivot axis and a sliding axis, each degree of freedom of movement can be associated with a positioning spring arrangement or a component of this. It is, for example, possible that in the case of multi-axis pivotability, by way of example a twin-axis pivotability, of the machining head relative to the handle part, at least two pivot axes or each pivot axis is associated with a positioning spring or positioning spring arrangement, so that the machining head relative to the handle element in relation to both pivot axes adopts a stationary central position or base position.

However, a preferred embodiment of the invention provides that the positioning spring arrangement does not impact in relation to each degree of freedom of movement of the machining head relative to the handle element. The machining head is expediently supported relative to the handle element by means of the joint assembly about a first degree of freedom of movement, by way of example so that it can pivot about a first pivot axis, wherein the positioning spring arrangement is effective in relation to this first degree of freedom of movement, whereas in relation to at least one second degree of freedom of movement, by way of example a pivoting mobility about a second pivot axis, of the machining head, the positioning spring arrangement has no effect.

It is preferred if the machining head in relation to a pivot axis, which runs perpendicularly, in particular perpendicularly at right angles, to a longitudinal axis of the handle element, is loaded by the positioning spring arrangement in the direction of the base position. In particular in this configuration, it is advantageous if the machining head in relation to a pivot axis, which in one place runs with a longitudinal axis of the handle element or is aligned with the longitudinal axis, is not loaded by the positioning spring arrangement in the direction of the base position or is supported in a free-floating manner. In relation to a longitudinal extension or longitudinal axis of the handle element, the machining head can advantageously be freely moved, by way of example supported in pendulum fashion, whereas perpendicularly, in particular perpendicularly at right angles, to this longitudinal axis or longitudinal extension or a plane, in which the longitudinal extension or longitudinal axis runs, it is loaded by the positioning spring arrangement in the base position.

The line arrangement can, by way of example, serve for the transmission of electrical energy. The electrical energy serves, by way of example, as the power supply to a drive motor of the machining head. But the electrical energy can also be a very small amount of energy, namely the energy for a data transmission. Furthermore, the line arrangement can serve for the transmission of mechanical energy, by way of example for the transmission of a rotational force from a drive motor, which is arranged on the handle element, to the machining head. By way of example, the line arrangement then comprises a flexible rotating shaft. For conducting a suction flow a suction tube can be provided. Via the suction tube dust, dirt or similar can be extracted from the area of the machining tool.

The handle element preferably has an elongated design. The handle element extends along a longitudinal axis or has a longitudinal axis. The handle element projects from the machining head in relation to the longitudinal axis or in the direction of the longitudinal axis.

On the handle element an energising device is expediently arranged for energising the drive motor.

In relation to the joint assembly, with which the machining head and the handle element are supported so that they can move towards one another, a number of variants are possible, by way of example at least one sliding bearing, at least one pivot bearing or both.

An embodiment is preferred, as shown in the drawing, in which the joint assembly comprises a pivot bearing arrangement. The joint assembly can also take the form of a pivot bearing arrangement. By means of the pivot bearing arrangement, the machining head is supported so that it can pivot relative to the handle element about at least one pivot axis. Preference is for a pivot bearing arrangement with a first and a second pivot bearing, the pivot axes of which are at an angle to one another. By way of example, the first and the second pivot axes of the two pivot bearings are at right angles to one another. Preference is for a gimballed pivot bearing arrangement or a gimballed support.

The joint assembly preferably comprises at least one sliding bearing for linear adjustment of the machining head relative to the handle element. It is, for example, possible for the machining head to be adjustable relative to the handle element along a longitudinal axis of the handle element.

It is preferred if the positioning spring arrangement comprises a first positioning spring and a second positioning spring, which impinge on the machining head in opposing directions and/or on opposing sides in the direction of the base position. The positioning springs thus act from different sides or in different directions of action, so to speak, in the direction of a central position, namely the base position. It is possible that the first and second positioning springs act with opposing torques on the machining head. By way of example, the positioning springs act in opposing directions of rotation or senses of rotation on the machining head.

At least one positioning spring extends expediently at least in a partially circular, or in a circular, manner about a pivot axis, about which the machining head is able to pivot relative to the handle element. Preferably two such positioning springs are provided, one of which impinges on the machining head in a first direction of rotation and the other positioning spring on the machining head in a second direction of rotation opposite to the first direction of rotation.

It is expediently provided that the first positioning spring and the second positioning spring, acting in opposing directions and/or on opposing sides in the direction of the base position, are arranged on bearings that are separate from one another and/or arranged at a distance from each other, in particular pivot bearings and/or sliding bearings. Thus, by way of example, the first positioning spring can be arranged on a first pivot bearing and the second positioning spring on a second pivot bearing. The machining head is expediently arranged between the pivot bearings. Thus it is, for example, possible for the two positioning springs in each case to be passed through by other axis elements or axis sections.

It is also expedient if the positioning spring arrangement is arranged, in particular directly, on at least one bearing of the joint assembly.

It is advantageous if the positioning spring arrangement comprises at least one positioning spring which is supported directly on bearing elements of the joint assembly. The bearing elements are, by way of example, component parts of a bearing for pivoting or sliding the machining head relative to the handle element in relation to a first pivot axis or sliding axis. By way of example, such a positioning spring, in particular a leg spring, supports itself on the one hand on a support arm, or fork arm of the joint assembly described in more detail below, and on the other on a bearing element that is immovably connected to the machining head or movably supported on the machining head. The bearing element movably supported on the machining head can, by way of example, be a bearing element, which for its part is movable about a further pivot axis or sliding axis in relation to the machining head. The bearing element connected to the handle part can, by way of example, be a component of a pivot bearing, by means of which the machining head is pivotable about a first pivot axis relative to the handle element.

However, in principle it is also possible that the, or a, positioning spring on the one hand is directly supported on a main body of the machining head and on the other on a component of the joint assembly or the handle element. Thus it is not absolutely essential that the positioning spring arrangement as a whole or at least a positioning spring is supported directly on a bearing or component of a bearing. An arrangement of a positioning spring outside a bearing of the joint assembly or next to a bearing is perfectly possible. Such a positioning spring arranged outside the bearing can be provided in addition to a positioning spring arranged inside a bearing.

It is advantageous if a positioning spring or all positioning springs of the positioning spring arrangement is or are enclosed in a housing, for example the bearing housing described in the following, in full or in part. A positioning spring arranged in this way is for example protected from damage and/or environmental influences or similar.

The integration of at least one positioning spring in a bearing of the joint assembly, in particular in a bearing housing, is advantageous. It is preferably provided that at least one of the bearing elements, on which a positioning spring is supported, has a bearing housing, in which the at least one positioning spring is enclosed in full or at least in part. By way of example, the bearing housing comprises a receiving sleeve for the positioning spring. In particular, a leg spring can be advantageously accommodated in such a receiving sleeve.

It is advantageous if at least one positioning spring, by way of example a leg spring or torsion spring, extends in a circular manner about at least one pivot axis of the joint assembly.

An expedient embodiment provides that at least one bearing element, on which a positioning spring is supported, comprises a bearing shaft part, e.g. a bearing pin, or that a bearing shaft part is arranged on the bearing element, on the outer periphery of which the positioning spring is arranged or which engages with the positioning spring. But the bearing shaft part or the bearing pin can also pass through the positioning spring. In combination with the embodiment described above, it is, by way of example, possible for the positioning spring, in particular a leg spring, to be passed through by the bearing shaft part or bearing pin and arranged in a receiving sleeve at least of a bearing element.

It is advantageously provided that the joint assembly comprises a fork, which protrudes from the handle element. The machining head or a bearing element, which for its part is immovably or movably connected to the machining head, is advantageously held or arranged between fork arms of the fork.

It is advantageous if the fork arms of this fork extend approximately in parallel to the longitudinal axis of the handle element.

A fork base or fork foot of the fork is expediently immovably connected with the handle element, for example a grip rod or grip part.

It is preferred if the fork, on its fork foot or fork base, has a passage for the line arrangement running between the handle element and the machining head. By way of example, the fork base or fork base is designed as a kind of clamp for clamping a profile and/or an end region of the handle element.

The fork arms, in any case at least one fork arm, are preferably reinforced with a ribbed structure.

The fork expediently serves to support the positioning spring arrangement, in particular one or all of the positioning springs of the positioning spring arrangement, in relation to the handle element. Consequently, the respective positioning spring is supported on the one hand on the fork, in particular the fork arms of this, and on the other on the machining head. In this way, the respective positioning spring is supported near to the machining head.

The respective positioning spring is preferably not supported on the fork on a connecting area of the fork with the handle element.

Advantageously, the respective positioning spring is supported on the fork on an end region of the fork facing towards the machining head, in particular on free end regions of the fork arms.

Advantageously, the following angular relationships are provided for between the handle element and the machining head in the base position.

In the base position, expediently on the one side a longitudinal axis of the handle element and on the other an axis of rotation of the tool holder and/or a machining plane of the machining tool provided for machining a workpiece or a base plane or foot plane of the machining head, are arranged at an angle to each other that can have the following ranges. The angle can preferably be in a range of between 0° and 90°. A somewhat narrower angle is preferred of, by way of example, 20-70°. In practice, an angular range of approximately 30-60° has proved to be advantageous.

In many cases it is also advantageous if the angle is in a range of approximately 25-40°. A basic setting at an angle of approximately 30° is advantageous. At these angles, by way of example the angle of approximately 30°, the machining head is thus obliquely inclined to the longitudinal axis of the handle element. The machining plane, by way of example a sanding plane or sanding surface of the machining tool is, by way of example, directed at an angle of 30° or one of the other stated angles to the longitudinal axis or longitudinal direction of the handle element designed in particular as a grip rod. So, if the operator holds the handle at an angle of approximately 30° or also another of the abovementioned angles obliquely to a vertical wall surface to be machined, the machining plane of the machining tool is parallel to the wall surface.

A pivot range of the machining head relative to the handle element is by way of example limited to approximately 180°, in particular 120°, preferably approximately 90-110°. By way of example, the machining head is pivotable between a first and a second displacement position, which at the same time represent maximum positions. The base position set by the positioning spring arrangement is located between the displacement positions. Clearly, these maximum positions do not need to be defined by fixed stops, but the maximum positions or maximum displacement positions can also represent springy stops or springy end positions. By way of example, in the maximum displacement positions, the positioning spring can have a stop or constitute a springy stop. But the abovementioned line arrangement between the handle element and machining head can have or form a solid or springy stop device to limit a pivot path or movement path of the machining head relative to the handle element.

Starting from the base position, the machining head can expediently pivot into a first displacement position, in which the axis of rotation of the tool holder is approximately at right angles to the longitudinal axis of the handle element. In the first displacement position, the machining plane of the machining tool, by way of example a sanding plane of a sanding plate, or an underside of a sanding plate, can also be parallel or approximately parallel to the longitudinal axis of the handle element. Starting from the base position, the machining head can preferably pivot into a first displacement position through approximately 30°.

In a second displacement position opposite to the first displacement position, in relation to the base position, the machining head is by way of example deflected by approximately 60° to 80° from the base setting or base position. In the second displacement position, by way of example, an axis of rotation of the tool holder is approximately parallel to the longitudinal axis of the handle element. In the second displacement position, the machining plane, in particular a sanding plane, of the machining tool is preferably approximately at right angles to the longitudinal axis of the handle element.

By way of example, the line arrangement comprises a suction tube for extracting chips, dust or similar generated by the machining tool. The suction tube is expediently elastic or flexurally flexible. The suction tube can have a cushioning effect.

However, the line arrangement can also, in addition, or alternatively to the suction tube, comprise an electrical line for transmission of electrical energy from the handle element to the machining head. Such a line arrangement, having one or more electrical lines, can also have a certain cushioning effect starting from the handle element on the machining head.

The positioning spring arrangement expediently counteracts a spring effect of the line arrangement, which loads the machining head relative to the handle element. So if, by way of example through impingement by the line arrangement per se, the machining head comes out of the base position the positioning spring arrangement acts like a compensation. This compensation can be provided in relation to one or more degrees of freedom of movement of the machining head relative to the handle element.

But it is also possible for the spring effect of the line arrangement and the spring effect of the positioning spring arrangement to jointly load the machining head in the direction of the base position. By way of example, it is possible for the line arrangement to load the machining head in a first pivoting direction in relation to a pivot axis and a positioning spring of the positioning spring arrangement to act in this first pivoting direction. A second positioning spring can similarly act in the first pivot direction or also against the first pivot direction, thus in a second pivot direction. An embodiment has already been described in which the positioning springs act in opposing directions of rotation or with an opposing sense of rotation between the handle element and the machining head.

It is also advantageous if the positioning spring arrangement, compared to the line arrangement, with respect to the machining head has a higher spring force and/or higher spring constant. Consequently, the positioning spring arrangement impinges on the machining head with greater force than the line arrangement, so that ultimately the spring force of the positioning spring arrangement is decisive for the positioning of the machining head in the base position.

An advantageous embodiment of the invention provides that the joint assembly is directed towards a centre or a focal area of the machining head.

It is advantageously provided that at least one pivot axis, preferably two pivot axes, or all pivot axes of the joint assembly, pass through a focal area or a central area of the machining head.

At least one line of the line arrangement, by way of example a suction tube, or the line arrangement as a whole, is expediently outside the centre or central area of the machining head or articulated at this. Thus, it is, for example, possible for the machining head in the area of its centre by means of the joint assembly to be movably supported in relation to the handle element and outside the centre to run lines from the handle element to the machining head. Consequently, the line arrangement acts by way of example eccentrically on the machining head and the positioning spring arrangement against this eccentric loading.

It can also be provided that the drive motor is arranged on the machining head eccentrically in relation to a pivot axis, in particular a pivot axis running perpendicularly, preferably at right angles, to the longitudinal axis of the handle element. In this connection in particular, though, even with other eccentric weight loadings, it is advantageously provided that the positioning spring arrangement compensates for a weight loading eccentrically to and/or off-centre of a pivot axis of the machining head, in particular through the drive motor. The positioning spring arrangement thus sets a weight loading of the machining head against the machining head, which does not act at the centre, in the base position.

It is mentioned at this point that while the positioning spring arrangement acts in the direction of the base position on the machining head, gravitational forces—depending on the respective centre of gravity of the machining head—impact on the machining head as a function of its relative spatial position, so that the positioning spring arrangement counteracts with differing force the gravity in the direction of the base position, but nevertheless the machining head, depending on its respective centre of gravity, is able to adopt different angular positions and/or slide positions, relative to the handle element.

An embodiment of the invention can provide that the suction connection and the drive motor are arranged on opposing sides of a pivot axis, in particular a pivot axis running perpendicularly to the longitudinal axis of the handle element, and that the positioning spring arrangement so to speak compensates or balances out the forces acting variously on the machining head via the suction hose and the drive motor relative to the handle element.

It is advantageously provided that the joint assembly has a first pivot axis and a second pivot axis, at an angle, in particular right angles, to each other. It is advantageous here if the first pivot axis runs transversally, in particular at right angles to a longitudinal axis of the handle element and the second pivot axis and the longitudinal axis of the handle element are arranged in a common plane or in planes parallel to one another. The first pivot axis runs perpendicularly to this plane or these planes, by way of example transversally at right angles. In this way, for example, a gimballed support is achieved.

An embodiment provides that a first pivot axis of the joint assembly running transversally to a longitudinal axis or longitudinally-extending axis of the handle element runs between the longitudinal axis of the handle element and a second pivot axis of the joint assembly, running transversally to the first pivot axis, by way of example at right angles.

It is advantageously provided that a, or the, first pivot axis running transversally to a longitudinal axis of the handle element is further away from the tool holder than a, or the, second pivot axis of the joint assembly running perpendicularly to the first pivot axis of the joint assembly, in particular at right angles. The second pivot axis runs, by way of example, directly on an upper surface of the machining tool or the tool holder, so that the machining head and consequently the machining tool is able to pivot, in particular oscillate, about this second pivot axis. This results in favourable guidance behaviour of the machining head. The second pivot axis is thus relatively close to the workpiece. The second pivot axis is, by way of example, what is known as an X-axis.

It is advantageous if the positioning spring arrangement loads the machining head in relation to the first pivot axis or a pivot axis running transversally to the longitudinal axis of the handle element in the base position. In relation to the second pivot axis or a pivot axis parallel to the longitudinal axis of the pivot axis, the machining head is expediently unloaded or in any case only loaded by a possible force as an effect of the line arrangement. Consequently, the machining head can oscillate or pivot relatively freely about the second pivot axis or pivot axis parallel to the longitudinal axis of the pivot axis, while in relation to the first pivot axis it is loaded by the positioning spring arrangement in a starting position, namely the base position.

The hand-held machine tool is preferably a sanding machine, polishing machine or milling machine. The hand-held machine tool is particularly preferably equipped with a handle element, protruding from the machining head or motor housing.

The handle element can be made in a single part or multiple parts. Preferably, the handle element is or comprises a grip rod. The grip rod can be a single-part component or have multiple rod sections, that can be separated from one another and/or are movable in relation to one another by means of bearings, so that, by way of example when not in use, the grip rod can be disassembled and/or compactly folded.

BRIEF DESCRIPTION OF THE DRAWINGS

In the following, an exemplary embodiment of the invention is described using the drawing. This shows as follows:

FIG. 6 A side view of the machining head;

FIG. 7 An exploded view of a drive of the machining head of the sanding machine;

FIG. 10 A drive motor of the sanding machine with a protective circuit in exploded view;

FIG. 11 A cross-section through the drive motor according to FIG. 6 approximately along a line of intersection A-A;

FIG. 12 A top view of a motor housing of the machining head, obliquely from behind;

DETAILED DESCRIPTION

Figure 1:
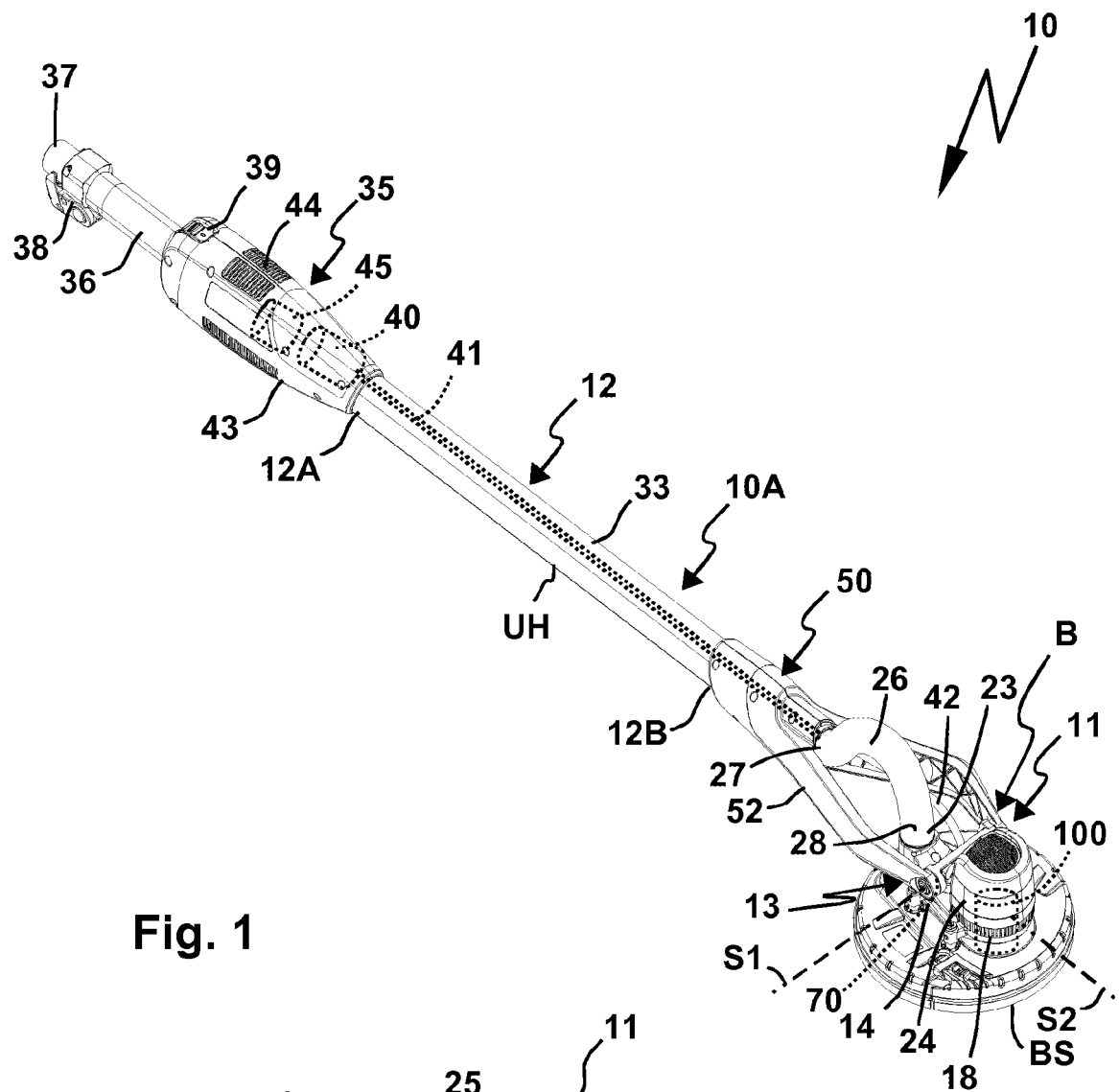
FIG. 1 A perspective view of a sanding machine.
Figure 2:
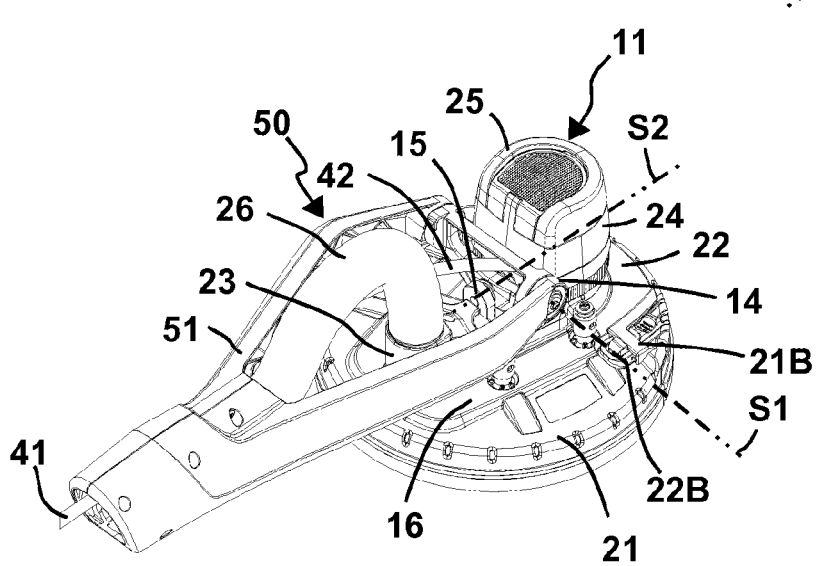
FIG. 2 A perspective view of the machining head, by way of example a sanding head, of the sanding machine in FIG. 1.

The exemplary embodiment relates to a hand-held machine tool 10 in the form of a sanding machine, wherein in respect of many partial aspects of the following description, however, other embodiments of hand-held machine tools are also possible, by way of example milling machines, polishing machines or similar. Furthermore, in the exemplary embodiment an elongated handle element is shown, which can in fact be shorter or longer. The hand-held machine tool according to the drawing is advantageous for the machining of ceilings or walls. The hand-held machine tool 10 according to the drawing can also be referred to as a ceiling and/or wall sanding machine. Aspects of the following designs do not necessarily relate exclusively to sanding machines, polishing machines or milling machines, but can also have applications in other hand-held machine tools.

The hand-held machine tool 10 has a machining head 11, supported in an articulated manner on a handle element 12 by means of a joint assembly 13, but in the present case not so that it can move by sliding, which would in principle be possible, but at least about a pivot axis, in the specific exemplary embodiment even about two pivot axes. The handle element 12 has a rod-shaped design. It has a longitudinal extension or longitudinal axis L. The longitudinally-extended handle element 12 allows the machining head 11 to be guided at a large distance from the user along a workpiece surface O of a workpiece W, by way of example a wall surface.

The joint assembly 13 supports the machining head 11 in relation to the handle element 12 by means of a first pivot bearing 14 swiveling about a first pivot axis S1 and by means of a second pivot bearing 15 swiveling about a second pivot axis S2. By means of the pivot bearings 14, 15 the machining head 11 is able to pivot relative to the handle element 12 about both pivot axes S1 and S2, wherein the pivot axes S1 and S2 are at right angles to one another. In principle it is not just right angles that can be considered, though. The pivot bearings 14, 15 advantageously form a gimballed support.

The pivot axis S1 runs transversally, in the present case transversally at right angles, to the longitudinal axis L of the handle element 12. The pivot axis S2 and the longitudinal axis L are advantageously arranged in a common plane or in planes parallel one another. The pivot axis S2 and the longitudinal axis L do not intersect in the present case.

The machining head 11 has a support body 16, on which a drive motor 17 is held. The drive motor 100 drives a tool holder 19 directly, or in the present case via a gear unit 80, about an axis of rotation D. The tool holder 19 is provided for holding a machining tool 20, which in the mounted state on the tool holder 19 can be driven by the drive motor 100 in a rotary motion. The tool holder 19 comprises, by way of example, a socket opening, bayonet contours, a screw thread or similar other assembly means known per se for mounting a machining tool.

However, at this point it is mentioned that instead of, or in addition to, the rotary motion of the tool holder 19, by way of example, an oscillating motion is also possible in another design of an exemplary embodiment. Furthermore, superimposed rotary motions, by way of example hypercycloidal rotational motions, of the tool holder 19 are possible, wherein then the gear unit 80 has a correspondingly different design, by way of example having an eccentric gear unit.

The machining tool 20 is in the present case a sanding machine, in particular a sanding plate. The machining tool 20 can contain a plurality of components, by way of example a sanding plate on which a sanding disc or a sanding sheet can be arranged. For this purpose, by way of example, a Velcro fastening between the sanding plate and the sanding sheet is advantageous.

By means of the machining tool 20 designed as a sanding tool, the hand-held machine tool 10 forms a sanding machine 10A. The machining head 11 could also be referred to as a sanding head. The longitudinally-extended, rod-shaped handle element 12 makes it easier to machine surfaces that are remote from the operator, by way of example wall surfaces. The hand-held machine tool 10 preferably forms a wall and/or ceiling sanding machine. However, the designs described in the following are also advantageous for a number of differently-designed hand-held machine tools, in particular sanding machines, but also saws, drills or similar.

The tool holder 19, and consequently the machining tool 20, when it is secured to the tool holder 19, are preferably arranged below a cover of the machining head 11. It would be possible, for example, for the cover 21 to cover the machining tool 20 across its entire outer periphery and upper surface. In the present case a cover 22 which is movable in relation to the cover 21, is provided by way of example on a front, free area of the machining head 11 and facing away from the handle element 12. The cover 22 is, for example, removable from the cover 21 and/or supported by means of a support on the cover 21 so that it can move, by way of example about a pivot axis parallel to the pivot axis S2. A plug-in assembly of the cover 22 on the cover 21 provides, by way of example, for pluggable projections 22B, for example plug-in flaps, which can be plugged into the socket openings 21B of the cover 21, and in particular are lockable with the socket openings 21B.

On the outer edge region of the cover 21, 22 a seal 22A, thus sealing elements, for example brushes, sealing lips or similar other sealing elements preferably adapted to the workpiece surface O, can be provided for. It is possible that the machining tool 20 protrudes beyond the seal 22A.

The cover 21, 22 is, by way of example, secured to a bottom side of the base plate or the support body 16 or is an integral part of the support body 16. On an upper surface, thus facing away from the tool holder 19, on the support body 16 a motor housing 24 for the drive motor 100 and a suction connection 23 are arranged.

On the upper surface of the motor housing 24 facing away from the tool holder 19, an air inlet or inlet opening 25 is arranged for admission of the cooling air for cooling the drive motor 100. The cooling air K flows out of the motor housing 24, by way of example, via an air discharge region 18 of this. By way of example, the air discharge region 18 is positioned in an area provided at an angle to the inlet opening 25, by way of example on the outer periphery of the motor housing 24. It would in principle be possible for the cooling air K to flow as far as the area enclosed by the covers 21, 22 and to contribute there, by way of example, to the cooling of the machining tool 20 or also to removal of dust.

The air discharge region 18 extends both in a working direction AR forwards, and laterally thereto, by way of example via an angular area of in each case approximately 90° laterally to the working direction AR. The cooling air K can thus blow freely across a working area AB extending forwards in the working direction AR and laterally to the working direction AR.

Via the suction connection 23, dust, dirt or chips can be extracted from the area covered or overlapped by the covers 21, 22. The suction connection 23 has, by way of example, a nozzle 23A.

A suction hose 26 with a hose end 28 is connected to the suction connection 23, the other hose end 27 of this being connected to the handle element 12.

The connection of the hose ends 27, 28 to fixed structures, for example the suction connection 23 and the handle element 12, is improved by structures 29, for example ribs, on the hose elements 27, 28. For securing the hose end 28 to the suction connection 23, a clamp 30 is, by way of example, provided for, which by means of a screw 30A can be brought into a clamping position which clamps the hose end 28 to the nozzle 23A. On the other hose end 27, by way of example a sleeve-shaped connecting piece 31 and a coupling 32 for connection with a rod-shaped channel body 33 of the handle element 12 are provided for, so that a dirt-charged suction flow S flowing out of the suction connection 23 is able to flow in a flow channel 34 of the handle piece 33.

At opposing longitudinal end regions 12A and 12B of the handle element 12 a handle section 35 and on the other side the machining head 11 are arranged. The handle section 35 serves preferably for an operator to grasp.

The rod-shaped, elongated channel body 33 extends between the joint assembly 13 and the handle section 35 of the handle element 12. The handle section 35 is arranged between the channel body 33 and a channel body 36, on which a suction connection 37 for connection of a suction tube C is provided. The suction tube C can, by way of example, be connected by means of a securing arrangement 38 with the channel body 36. The securing arrangement 38 comprises, by way of example, a hose clamp, a hook arrangement or similar.

On the handle section 35 a switch 39 is arranged for switching on the drive motor 100.

In the area of the handle section 34 an excitation device 40 is arranged for exciting a exciter coil arrangement 120 of the drive motor 100.

Via a mains lead N which, by way of example, is arranged on the suction tube C or can be incorporated in the suction tube C, the excitation device 40 can be connected to an electricity supply system V or other power source. The other power source may, by way of example, be a battery pack or other energy storage device that can be on-board the hand-held machine tool 10.

Via diodes D1, D2, D3 and D4 of a rectifier G, the excitation device 40 can, by way of example, from an alternating voltage provided by the supply system V, generate in a known fashion a direct voltage UG versus ground or a base potential of U0, wherein between the potentials UG and U0 advantageously a capacitor C1, by way of example a smoothing capacitor or intermediate capacitor, is arranged.

An output stage E, e.g. a commutator, is connected to lines with the potentials U1, U0, which via conductors L1, L2 and L3 provides excitation currents 11, 12 and 13 for the drive motor 100. The output stage E comprises, by way of example, switch pairs with power electronics switches, by way of example MosFETs, V1, V2 and V3, V4 and V5, V6 between which the conductors L1, L2 and L3, respectively, are connected in the manner of half bridges.

The switches V1-V6 are triggered by a controller 170 via control lines (not shown). The controller 170 monitors, by way of example by means of a current monitoring device 171, the current flow on conductor L1. Other current monitoring devices could in fact also be provided, by way of example for conductors L2 and L3. The current monitoring device 171 has, by way of example, an appropriate inductance for recording the current flow on conductor L1.

The controller 170 expediently comprises a control program 173, comprising a program code executable by a microcontroller 172 of the controller 170. By executing this program code, the controller 170 can trigger the switches V1-V6 appropriately, in order that through an appropriate current flow on conductors L1 to L3 a speed and/or power output of the drive motor 100 can be set. But the switching behaviour of the switches V1-V6 can be an indicator for the controller 170 that current is no longer flowing via one or more of the conductors L1 to L3.

The line arrangement 41 comprises an electric cable 42, in which the conductors L1, L2 and L3 are arranged. The cable 42 runs, starting from the handle section 35, in the channel body 33 or outside the channel body 33 and emerges from the channel body at its end region facing away from the machining head 11. From there the cable 42 runs freely as far as the drive motor 100.

On the handle section 34, a housing 43 is provided in which an excitation device 40 is arranged. Apart from the power electronics components, the excitation device 40 expediently also has mechanical components, for example cooling means. Consequently the excitation device 40 weighs a certain amount, but this does not hamper operation of the hand-held machine tool. This is because the excitation device 40 is arranged directly on the handle section 34, where the operator generally grips the handle element 12 with at least one hand. Consequently, in respect of the electrical drive technology, only the drive motor 100 acts in the sense of a lever on the handle section 34, whereas the current conditioning so to speak for the drive motor 100, is located with a favourable centre of gravity directly in the handle area of the handle element 12.

The arrangement of the electronics which are comparatively sensitive or sensitive to dirt or dust in the handle section 34 also has the advantage, that it is as far away as possible from an area of the hand-held machine tool 10, where dust occurs, namely on the machining head 11.

Consequently, by way of example through air flowing in through inlets 44 in the housing 43, which is preferably particularly further conveyed by cooling means, such as for example a fan 45, due to the large distance from the machining tool 20 there is less loading from dust.

Figures 3, 15:
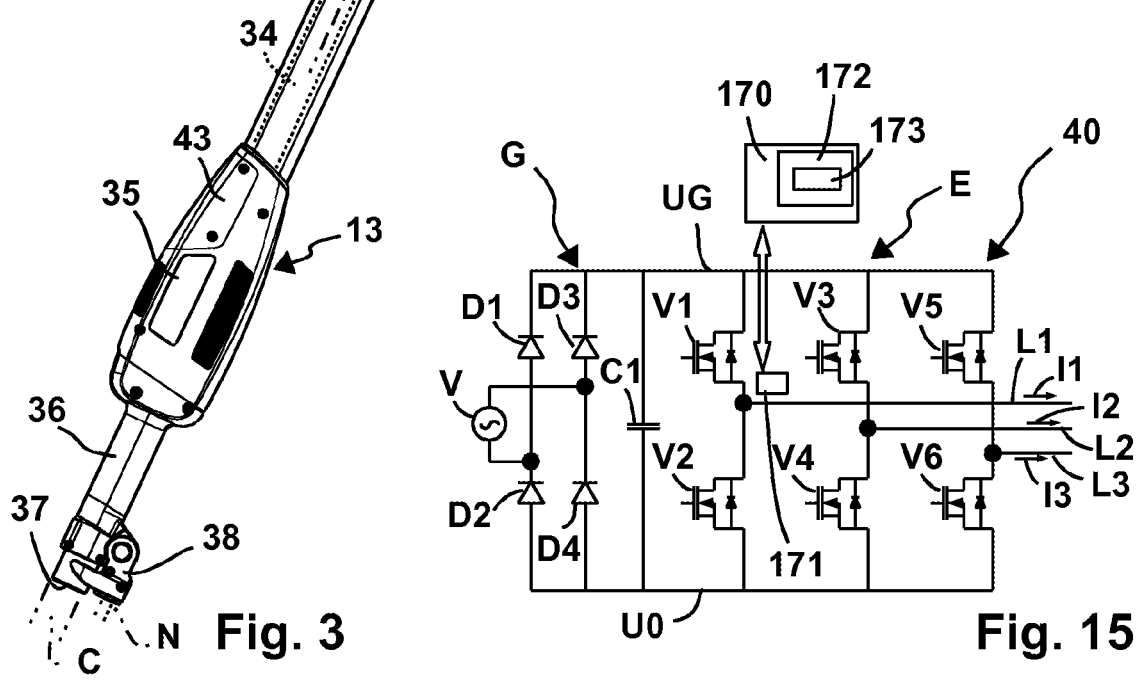
FIG. 3 A side view of the sanding machine with a machining head in a base position.
FIG. 15 A control circuit for the drive motor.

A contribution to the ease of handling of the hand-held machine tool 10 is made by the drive motor 100 and the suction connection 23 being arranged on opposite sides of an articulated-connection region 46 of the machining head 11, wherein the joint assembly 13 is flexibly connected at the articulated-connection region 46 with the machining head 11. Between the free ends of the handle element 12, where it is connected with this, and the machining head 11, the suction hose 26 has curved sections, in particular two curved sections 47, 48 curving in different directions, so that it comfortably follows the movements of the machining head 11 relative to the handle element 12. This is clear from FIGS. 3, 4 and 5.

The tool holder 19 is arranged on a machining side BS of the machining head 11. In a base position B of the machining head 11 relative to the handle element 12, the machining side BS and a bottom side UH of the handle element 12 face towards the workpiece W.

Figures 4, 5:
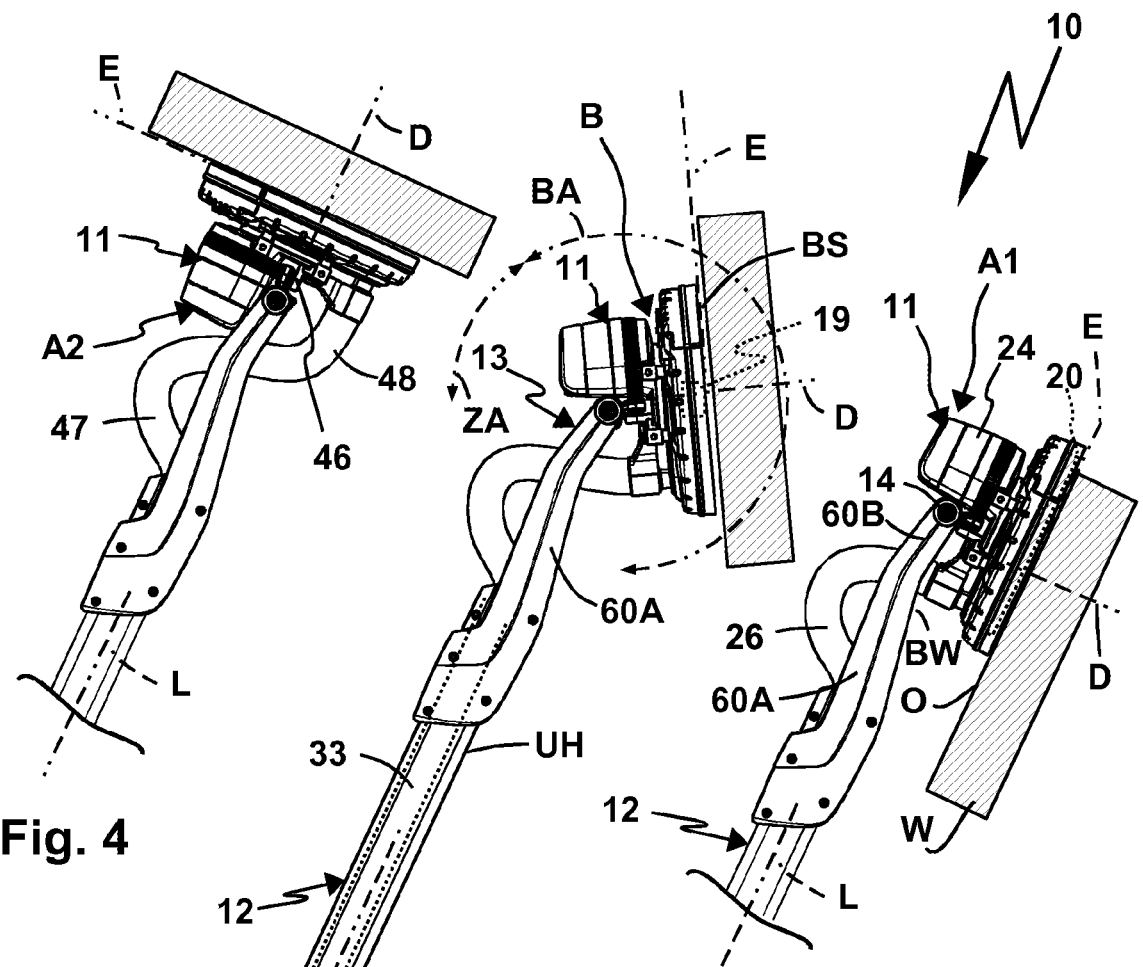
FIG. 4 A partial view of a first displacement position shifted from the base position.
FIG. 5 A view of a second displacement position shifted from the base position.

Starting from the base position B (FIG. 3), the machining head 11 can pivot between displacement positions A1 (FIG. 5) and A2 (FIG. 4). The displacement positions A1, A2 are expediently maximum positions, wherein tilting beyond these displacement positions A1, A2 is perfectly possible. If the suction hose 26 is to be displaced or deformed by a greater amount beyond the displacement positions A1 and A2, it expediently forms a springy stop for the displacement positions A1 and A2.

The base position B, together with the displacement positions A1 and A2 and possibly further displacement positions beyond these displacement positions or intermediate displacement positions between the displacement positions A1 and A2, forms a component of a basic working area BA of the hand-held machine tool 10. A pivoting beyond the displacement position A2, such that the machining side BS and an upper surface of the handle element 12 face towards a workpiece W, is perfectly possible. Then the machining head 12 is, by way of example, positioned in an additional working area ZA.

In the displacement positions A1, by way of example a machining plane E of the machining tool 20 runs approximately parallel to the longitudinal axis L, while in the displacement position A2 the machining plane E is approximately at right angles to the longitudinal axis L.

On the end region of the handle element 12 holding the machining head 11, so, in the present case, the channel body 33, a fork 50 is arranged, between the fork arms 51, 52 of which the machining head 11 is supported so it can pivot about the pivot axis S1. The fork arms 51, 52 on a retaining section 53 are designed like half shells, between which a mounting 54 or receptacle for the handle element 12, in particular its channel body 33, is formed.

The mounting 54 is, by way of example, configured between walls 55 of the fork arms 51, 52, by way of example as a round receptacle contour. Support structures 58 of the fork 50, which in particular may take the form of the screw bosses 57, serve as protection against rotation and/or displacement in relation to the longitudinal axis L of the handle element 12. Support structures 33A of the handle element 12, by way of example indentations provided on the outer periphery of the channel body 33, in particular grooves or longitudinal indentations, engage in the support structures 58, by way of example form-fit projections. The support structures 58, 33A act as a protection against rotation and/or displacement in relation to the longitudinal axis L of the handle element 12.

To relieve the strain on the cable 42 it is advantageous if a cable clamp 49 is provided on the fork 50. The cable clamp 49 has, by way of example, clamping pieces provided on each of the fork arms 51, 52, which when the fork arms 51, 52 are closed up to secure the holding element 12 simultaneously clamp the cable 42.

The fork arms 51, 52 are in particular reinforced on their arm sections 60A, 60B protruding in front of the retaining section 53, by way of example, by a ribbed structure 59.

Between the retaining section 53 and their free ends 61, the fork arms 51, 52 have angulations 62, 63 between the arm sections 60A, 60B. The angulations 62, 63 preferably serve to provide an optimal design of the space between the fork arms 51, 52 and the movement area below the fork arms 51, 52 for the machining head 11.

The angulations 62 run in opposite directions from each other in the sense of an expansion or extension of a distance between the ends 61. In this way, in particular in the area of the suction hose 26 and the suction connection 23 an enlarged movement area between the fork arms 51, 52 is available.

Figure 8:
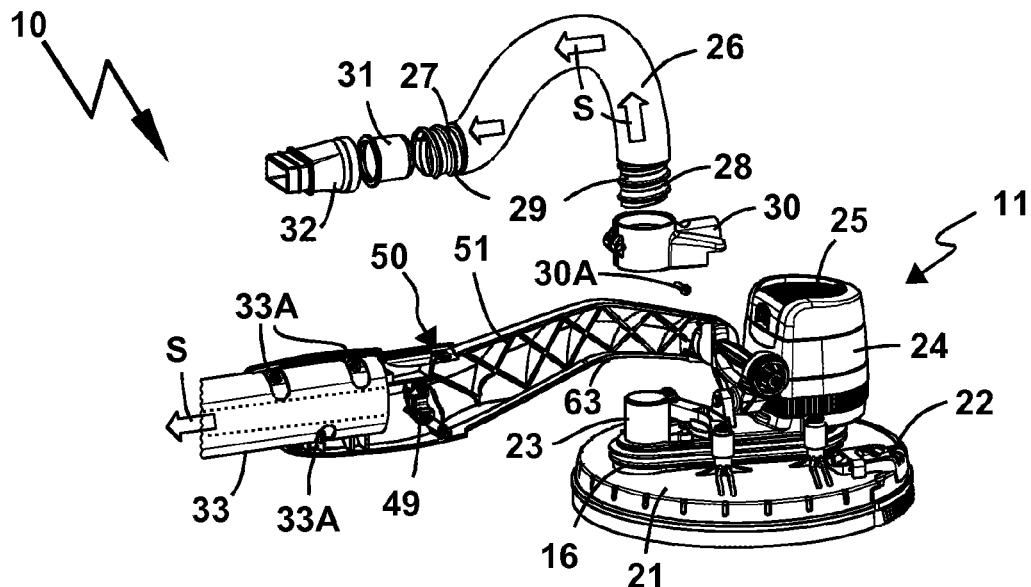
FIG. 8 The machining head of the sanding machine with a joint assembly in exploded view.
Figure 9:
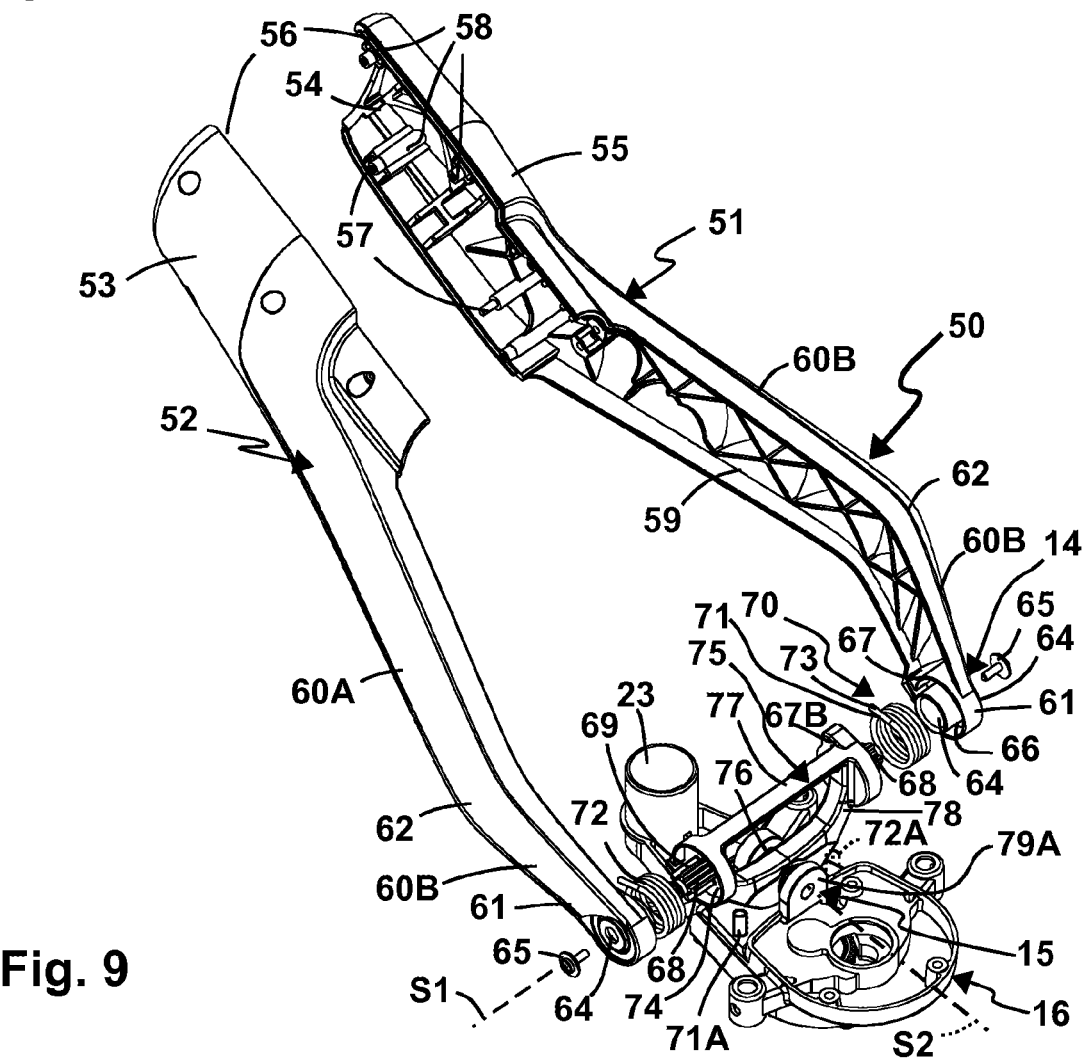
FIG. 9 The joint assembly of the sanding machine in exploded view.

The angulations 63 run in the same direction alongside one another, but starting from the handle element 12 and in relation to the longitudinal axis L in a direction away from the machining head 11 and at the free ends 61 on towards the machining head 11 or the longitudinal axis L, so that in particular for the displacement position A1, for instance according to FIG. 8, or a further pivoting beyond the displacement position A1, an area BW below the fork arms 51, 52 is available for an upper section of the machining head 11.

On the free ends 61, bearing elements 64 designed as bearing seats for bearing shaft parts 65 of the pivot bearings 14 are provided. The bearing shaft parts 65 which, for example, are designed in the form of bearing pins, are, by way of example, screws or similar other bolts, which pass through the bearing seats of the bearing elements 64 and penetrate bearing elements 68 designed as bearing projections.

The bearing elements 68 are provided on a bearing body 75 and protrude in front of a cross beam 77 of the bearing body 75. The bearing body 75, by way of example, is designed like a bearing shaft or bearing projection. By way of example, the bearing elements 68 are provided on the respective longitudinal end regions of the cross beam 77. A support bearing section 78, by way of example in the shape of an arc, extends between the cross beam 77 and the support body 16.

The support bearing section 78 forms a component of the pivot bearing 15 for pivoting about the pivot axis S2. The support bearing section 78 is passed through by a bearing shaft 76, which for its part is accommodated in bearing seats 79 of bearing blocks 79A, which protrude in front of the support body 16. The support bearing section 78 is arranged between the bearing blocks 79A. Obviously, in place of the bearing shaft 76, bearing pins could also be provided which, by way of example are accommodated, in particular rotatably, in bearing seats 79 passing through the bearing body 75. Consequently, the pivot axis S2 is thus closer to the support body 16 than the pivot axis S1, so that the machining head 11 can pivot about the pivot axis S2 positioned correspondingly close to the machining plane E. The machining head can conveniently follow the course of the workpiece surface O. The machining head 11 pivots or oscillates freely in relation to the pivot axis S2, wherein the suction hose 26 and the line arrangement 41 dampen or brake the pivoting motion. However, it is important to note here that the suction connection 23 is close to the pivot axis S2 or is passed through by the pivot axis S2, which restricts the ability of the machining head 11 to pivot about the pivot axis S2 correspondingly less.

Conversely, in relation to the pivot axis S1, a positioning spring arrangement 70 is provided, which impinges on the machining head 11 in the base position B. The positioning spring arrangement 70 comprises positioning springs 71, 72 directly supported on the bearing elements 64, 68. The positioning spring 71 is associated with the fork arm 51, whereas the positioning spring 72 is associated with the fork arm 52. The positioning springs 71, 72 impinge on the machining head 11 in opposing directions, that is to say that one positioning spring 71 impinges on the machining head 11 by way of example in relation to the pivot axis S1 in the clockwise direction, whereas the other positioning spring 72 impinges on the machining head 11 in the anticlockwise direction. Consequently, the machining head 11 in respect of the pivot axis S1 is, so to speak, held in a central position, namely the base position B.

The positioning springs 71, 72 are supported by support arms 73 on support seats 67 of the bearing elements 64 and support seats 67B on the bearing elements 68. The positioning springs 71, 72 are, by way of example, leg springs, the longitudinal ends of which are configured as support arms 73.

The bearing elements 68 pass through the positioning springs 71, 72. On the outer periphery of the bearing elements 68 supporting contours 69, for example ribs, are expediently provided, on which the positioning springs 71, 72 are able to support themselves with their inner periphery. The ribs or supporting contours 69 expediently run parallel to the pivot axis S1. In this way, the movement of the positioning springs 71, 72 and the bearing elements 68 relative to one another is particularly good.

The positioning springs 71, 72 are expediently protected and enclosed. They are advantageously accommodated in bearing housings 66, 74, provided by the bearing elements 64, 68. By way of example, the bearing housings 66, 74 complement each other or fit inside each other like sleeves or plug-in elements, in order to fully enclose the positioning springs 71, 72. In this way, the bearing components and in particular also the positioning springs 71, 72 do not cause any soiling. In addition, the risk of injury from any protruding elements, such as for example the support arms 73, is low.

The support seats 67 are, by way of example, provided on the bearing housings 66 of the bearing elements 64. The support seats 67B are provided on the bearing housings 74 for the bearing elements 68.

It is clear that, in respect of the pivot axis S2 also a positioning spring arrangement can be provided which aligns the machining head 11 to the handle element 12 in respect of the pivot axis S2. There would be the possibility, by way of example, of leg springs, which are passed through by the bearing shaft 76 and which are on the one hand supported on bearing blocks 79A and on the other on, by way of example, the support bearing section 78. Further elastic positioning springs 71A, 72A designed, by way of example, as rubber buffers are shown schematically, supported outside the bearing 15 on fixed structures of on the one hand the joint assembly 13, by way of example the support bearing section 78, and on the other of the machining head 11, by way of example the support body 16 and which consequently bring about a positioning of the machining head 11 to the handle element 12 in relation to the pivot axis S2.

The drive motor 100 is arranged eccentrically in relation to the articulated-connection region 46 or in relation to the axis of rotation D of the tool holder 19. For the force transmission between an output 81 of the drive motor 100 the gear unit 80 is provided. The gear unit 80 comprises, by way of example, an arrangement of a plurality of toothed wheels, which bring about a change in speed, in particular a speed reduction, and/or a deflection of force from the output 81 to the tool holder 19. In this case a rotary transmission concept is provided for, i.e. the tool holder 19 rotates exclusively about the axis of rotation D. But an eccentric motion would be also be possible, by way of example eccentrically to the axis of rotation D, which is not shown in the drawing, however, and would represent another embodiment. Furthermore, a rotary motion of the tool holder 19 with an overlaid eccentric motion would also be perfectly possible, by way of example if a suitable transmission gear unit were present instead of or in addition to the gear unit 80. Finally, what is known as a hypercycloid motion mode of the tool holder 19 would also be possible using an appropriate gear unit.

The output 81 engages with a toothed wheel 82, which drives a shaft 84, with which the toothed wheel 82 has a torsionally rigid connection. A toothed wheel 83 also has a torsionally rigid connection with the shaft 84, which for its part engages with a drive wheel 85. The drive wheel 85 has a torsionally rigid arrangement on a shaft 86, at the free end region of which the tool holder 19 is arranged in a torsionally rigid manner.

The arrangement of the toothed wheels 82, 83, 85 brings about a speed reduction and also a force deflection, since the axis of rotation of the output 81 and the shaft 86 are not coaxial.

The shaft 84 is rotatably supported by bearings 87 on the one hand in relation to the support body 16 and on the other in relation to gear unit housing 90 connected to the support body 16. The support body 16 forms a cover for the gear unit housing 90. By way of example, on the support body 16 and the gear unit housing 90, bearing seats 91 for the bearing 87 designed in particular as a rolling bearing, are provided.

The shaft 86 is rotatably supported via a further bearing 87 in relation to the support body 16 and a bearing 88, which is accommodated in the bearing seat 92 of the bearing housing 90, in relation to the bearing housing 90. Consequently, the respective longitudinal end regions of the shafts 86, 84 are supported by pivot bearings on a protective housing.

The gear unit housing 90 has a plate 96, on which the bearing seats 91, 92 are provided. On its bottom side facing towards the tool holder 19, the bearing seat 92 is provided with a sealing edge 93 surrounding the bearing seat 92, so that the gear unit housing 90 encloses the gear unit 80 from the bottom up. The bearing 88 fits closely to the sealing edge 93 with, by way of example, an additional dust seal.

The top enclosing of the gear unit 80 is expediently achieved by the support body 16. The support body 16 has, by way of example, socket openings not visible in the drawing, in which pluggable projections or screw bosses 95 of the gear unit housing 90 engage from below. An edge region 97 of the gear unit housing 90 is, by way of example, provided with a seal, so that it fits closely on a sealing region 98, by way of example a sealing edge, of the support body 16.

The support body 16 thus contributes to the enclosing of the gear unit 80. From the top it encloses the gear unit housing 80 almost completely, apart from a motor receptacle 89, in which the drive motor 100 is accommodated. The support body 16 forms, by way of example, a housing part of the gear unit housing 80, in particular a housing shell.

Support projections 99, by way of example arms, protrude laterally from the support body 16, by way of example four support projections 99, on each of which pin seats or mounting seats 94 for accommodating mounting elements 94B for connection with the cover 21 protrude.

The suction connection 23 is also provided on the gear unit housing 90. The suction connection 23 protrudes laterally in front of the support body 16.

Similarly to the gear unit 80, the drive motor 100 is optimally protected from dust as explained in the following. The drive motor 100 has, by way of example, a rotor 101, which is incorporated in a stator 110. The drive motor 100 is a brushless, electronically commutated motor, which can be excited by the excitation device 40.

The rotor 101 comprises a motor shaft 102, on which a laminated core 103 is arranged. Longitudinal ends of the motor shaft 102 protruding in front of the laminated core 103 are rotatably supported, in relation to the stator 110, by a motor bearing 104 and on the drive bearings 105, by way of example rolling bearings and/or slide bearings.

On a free end region of the motor shaft 102, e.g. on the motor bearing 104, a fan bracket 108 for holding a fan propeller 109 is provided.

A fan propeller 109 and the tool holder 19 are arranged on opposite sides of the drive motor 100.

The fan propeller 109 provides forced ventilation, e.g. air is so to speak sucked in through the inlet opening 25 by the fan propeller 109, flows through the stator 110 and emerges on the opposite side of the stator 110 to the fan propeller 109, in the region of the drive bearing 105, from the stator 110 and continues to flow to the air discharge region 18.

The stator 110 comprises a stator body 111, having a bearing seat 112 on a bearing cover 125A, in which the motor bearing 104 is accommodated. The motor shaft 102 passes through, by way of example, a through opening 113 of the stator 110 and is retained by an end region on the motor bearing 104. The bearing cover 125A is, by way of example, formed integrally with the stator body 111, but could also be designed as a component that is detachably connected to the stator body 111, like the bearing cover 125 described further on.

Apart from the through opening 113 a projection 114 is provided, which engages in a groove 106 on the rotor 101, by way of example on the laminated core 103. In this way, a certain labyrinth structure is created, which contributes to the tightness of the drive motor 100. The laminated core 103 is accommodated in a rotor receptacle 115 of the stator body 111.

The stator body 111 comprises, by way of example, a plastic material. Coils 121 of an exciter coil arrangement 120 are arranged on supports 116 of the stator body 111. A perimeter wall 117 of the stator 110, by way of example made from a plastic material, extends radially outwards on the supports 116.

A base of the supports 116 is formed, by way of example, by the material of a laminated core 111B, which is overmoulded with the plastic material to configure the stator body 111.

The exciter coil arrangement 120 has connections 122, 123 and 124, which are electrically connected with the conductors L1, L2, L3. The connections 122-124 are associated with phases P1, P2 and P3 of the exciter coil arrangement 120. The connections 122-124 are, by way of example, arranged on a front side of the stator body 111, in particular the perimeter wall 117.

The rotor receptacle 115 is sealed by a bearing cover 125, which can be integrated in the motor housing 24. The bearing cover 125 has, by way of example, a bottom wall 133, from which a fastening projection 126 protrudes for closing the rotor receptacle 115. The fastening projection 126 has a projection 127, which engages in a groove 107 of the rotor 101, namely on the laminated core 103. In this way a labyrinth seal or labyrinth seals 118 is or are created. The projections 114, 127 are, by way of example, circular projections, while the grooves 106, 107 are circular grooves. The grooves 106, 107 are, by way of example, provided on opposite front sides of the laminated core 103.

The bottom wall 133 and the fastening projection 126 seal the drive motor 100 on its front side with the motor bearing 105. A wall 17 of the gear unit housing 80 which, by way of example, can be a component of the support body 16, also forms a wall that closes off the drive motor 100 on the front side.

In the region of the fastening projection 126, a further receptacle 128 is arranged for a bearing seat element 130. The bearing seat element 130 has a bearing seat 131 for the drive bearing 105. The bearing seat element 130 is, by way of example, screwed into a thread 129 of the receptacle 128 or locks into the receptacle 128 by means of suitable snap contours. A gasket 132 or other sealing element is retained in the bearing seat element 130. The gasket 132 holds the drive bearing 105 in the bearing seat 131.

Between the supports 116 of the stator body 111 and, consequently, between the coils 121, cooling channels 119 are provided, via which the cooling air K is able to flow through the stator 110 and consequently the exciter coil arrangement 120. The cooling air K flows on a side of the drive motor 100 facing away from the tool holder 19 into the cooling channels 119 and on a side of the drive motor 100 facing towards the tool holder 19 out of the cooling channels 119. There it is deflected by a bottom wall 133 of the bearing cover 125 radially outwards and flows through a flow chamber 134 to a perimeter wall 135 of the cover 130, on which the air discharge region 18 is provided. By way of example, on the perimeter wall 135, ribs 136 are provided, between which gaps or outflow openings 137 are present, through which the cooling air K can flow out of the motor housing 24. The flow chamber 134 is provided between the perimeter wall 135 and the perimeter wall 117. Support ribs or support walls 138 advantageously extend between the perimeter wall 117 and the perimeter wall 135. On the support walls 138 conductor seats 139 for accommodating or retaining the conductors L1, L2 and L3 are advantageously provided.

The cable 42 is introduced via an inlet 140 on the perimeter wall 135 into the flow chamber 134. From the cable 42, the individual conductors L1, L2 and L3 are lead out and retained on the support walls 138, namely in the conductor seats 139, and connected with the connections 122-124 of the exciter coil arrangement 120.

FIG. 11 illustrates how the bottom wall 133 runs above the support body 16, and the perimeter wall 135, so to speak, protrudes in front of the support body 16. The perimeter wall 135 is provided on its upper front side 141 with a sealing contour 142, which engages with a corresponding sealing contour 143 of a perimeter wall 144 of the motor housing 24. This results in a substantially dust-tight connection between the motor housing 24 and the bearing cover 125.

A flow housing or air routing body 145 is incorporated in the motor housing 24, extending around the drive motor 100. By way of example, the air routing body 145 has a wall 146, which delimits an air routing region 147 around the drive motor 100. The wall 146, by way of example, is designed as an air routing sleeve and/or perimeter wall and/or as a flow housing. In any event, via the air routing region 147, which can also have channels, the cooling air K flows along the outer periphery of the stator 110 and cools this. The wall 146 is, by way of example, in the region of the fan propeller 109 cylindrical and protrudes as far as the fan propeller 109.

The wall 146 thus helps the propeller blades 109A of the propeller 109 to, so to speak, push cooling air K particularly effectively towards the drive motor 100 or the stator 110 and the rotor 101.

The air routing body 145 has, on its longitudinal end region (in relation to a longitudinal axis of the motor shaft 102) remote from the fan propeller 109, front wall sections 146A and 146B extending radially in relation to the motor shaft 102 from the wall 146, which run above the air discharge region 18 and thus deflect the cooling air K radially outwards from the motor housing 24.

It is preferably provided that the drive motor 100 is electromagnetically screened. By way of example, the air routing body 145 can be designed as an electromagnetically screening housing. To this end, the air routing body 145, by way of example, comprises metal or has a metal component. But, in an advantageous embodiment of the invention, the motor housing 24 can also provide electromagnetic screening, by way of example being provided with a conductive protective film or protective layer.

The conductors L1-L3 in the cable 42 are advantageously run in an electromagnetic screening 177, in particular a braid. The screening 177 is preferably earthed. An overall contribution is made to the electromagnetic compatibility of the drive motor 100 and the hand-held machine tool if the screening 177 is conductively connected to the drive motor 100, by way of example with the stator 110, in particular the laminated core 111B. The screening 177 can, by way of example, be conductively applied to this by means of a spring.

In the region of the air inlet or inlet opening 25, the motor housing 24 has a projection wall 148 and a cover wall 149. The cover wall 149 covers, so to speak, the top of the motor housing 24, wherein however on the cover wall 149 air outlets or air inlets 150 for the cooling air K are present.

In the region of the cover wall 149, a recess 151 is provided for a filter element 152, which is inserted in the receptacle 151. By way of example, the receptacle 151 is delimited by the inner periphery of the projection wall 148. The filter element 152 has, by way of example, a filter fabric 154 or another close-meshed filter structure, which is arranged above the air inlets 150. Consequently, contaminants, by way of example dust or similar, contained in the cooling air K, are filtered out by the filter element 152.

The filter element 152 is expediently clicked into place on the motor housing 24 by means of catch means 153, by way of example comprising a springy catch or similar. The catch means 153 form component parts of a mounting 153A.

On an upper, free end region of the motor housing 24 a housing 155 is provided for a protection body 156. Whereas the motor housing 24 comprises a relatively hard plastic, so that it can deliver an optimum protective effect for the drive motor 100, the protection body 156 is by comparison soft or elastic. The protection body 156 is, by way of example, designed like a bracket. The protection body 156 efficiently cushions shocks that may impact on the machining head 11 and consequently damage, primarily, the drive motor 100.

It is preferred if the protection body 156 is flexurally flexible. The protection body 156 is in itself horseshoe-shaped or U-shaped, but can be curved. Consequently, it is, by way of example possible to, so to speak mount support seats 158 arranged on its free end regions 158 on support projections 159 of the motor housing 24. It is advantageous if the protection body 156 has further support contours, for example a support projection 158A, that runs along a side edge and can be hooked into a corresponding, by way of example U-shaped, support receptacle 159A of the motor housing 24.

The drive motor 100 is provided with a protective circuit 160, which in situ, namely on the machining head 11, protects the drive motor 100 from overheating or other damage.

The protective circuit 160 has, by way of example, an isolating switch 161. In principle, it would be possible to integrate the isolating switch 161 directly in the motor housing or in any case the stator 110 of the drive motor 100. However, in the present case an installation-friendly, easily upgradeable or exchangeable concept is selected, in which the isolating switch 161 is arranged outside the stator 110, but in direct contact with it.

The isolating switch 161 comprises a thermally operated switch or is formed by this, wherein when the stator 110 heats to above a predetermined temperature, the thermally operated switch moves to an isolating position, but otherwise adopts a connecting position. In the connecting position, the isolating switch 161 connects conductor L1 with the connection 122 associated with a phase of the exciter coil arrangement 120, whereas in the isolating position it isolates the conductor L1 from connection 122 and consequently phase P1 of the exciter coil arrangement 120.

Figure 13:
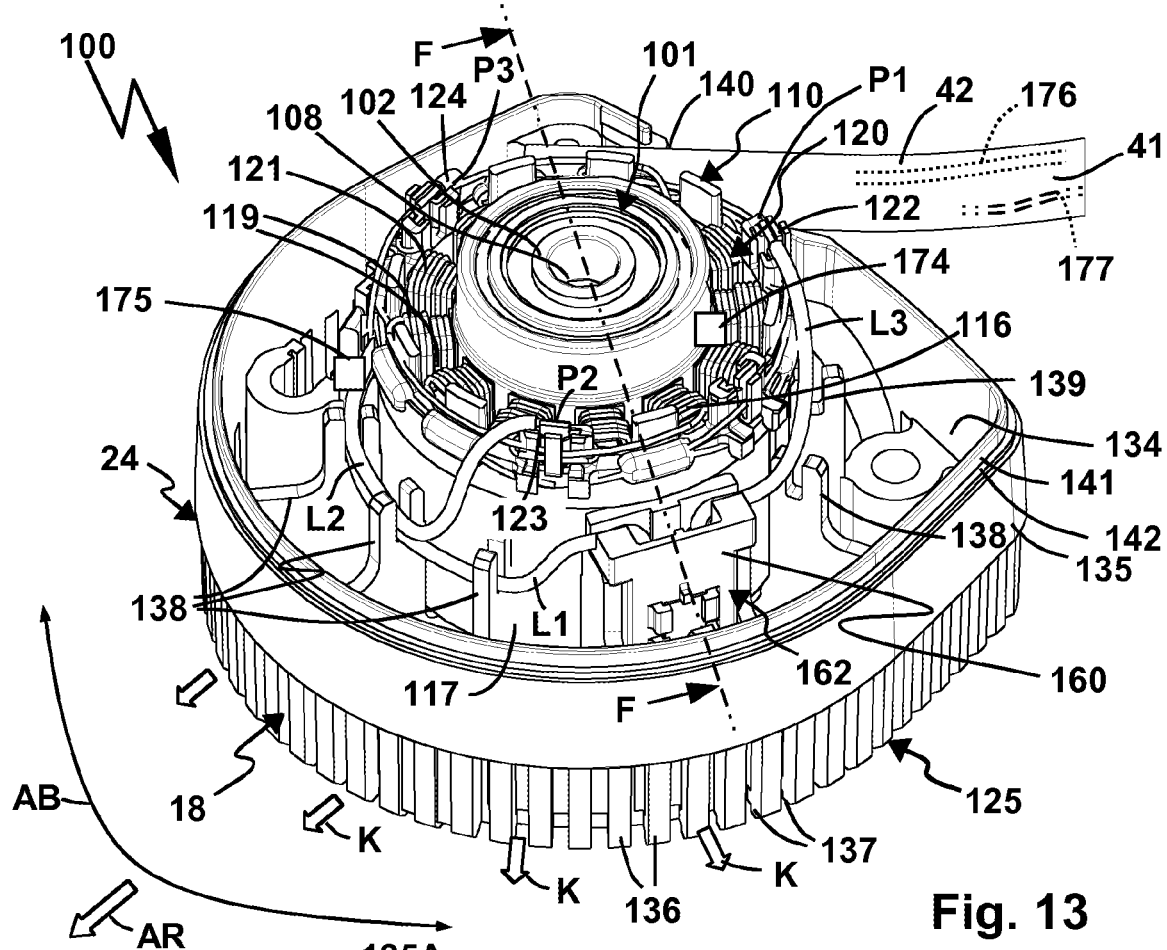
FIG. 13 A perspective view from above of a motor assembly of the machining head with the drive motor.
Figure 14:
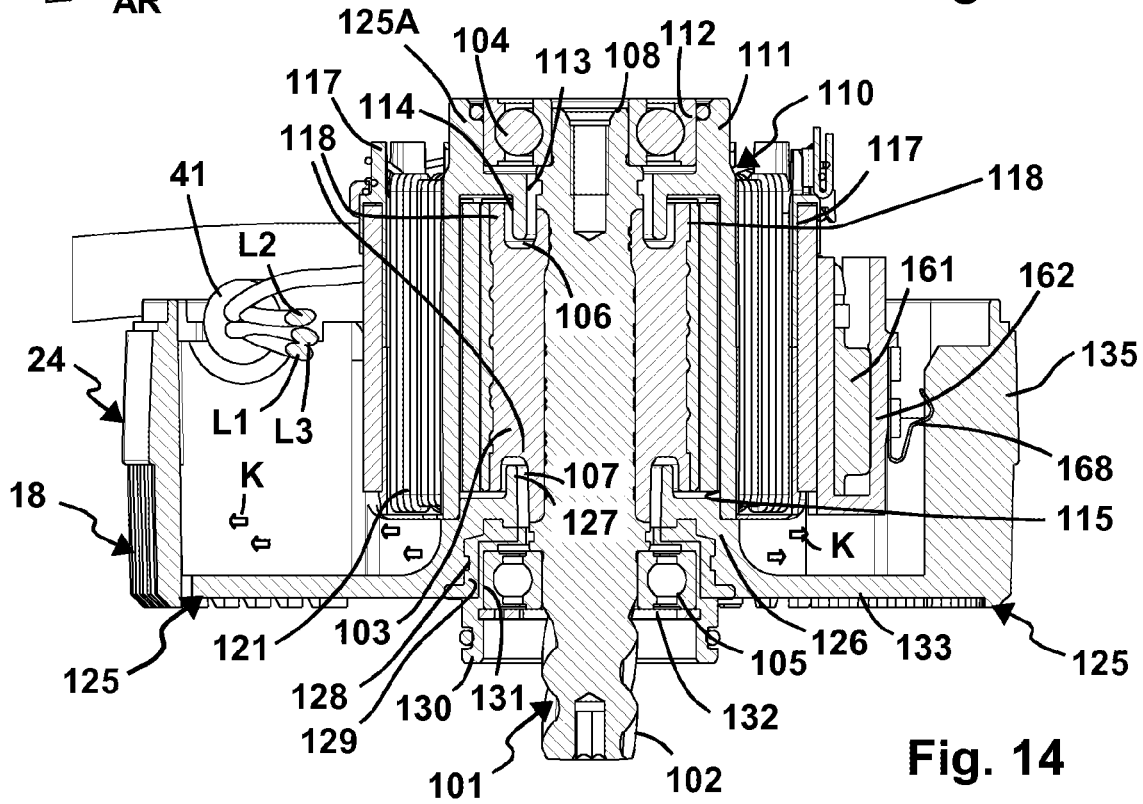
FIG. 14 A cross-sectional view approximately along a line of intersection F-F in FIG. 13.

The isolating switch 161 is expediently arranged in a protective housing 162, having a housing part 163A and a housing part 163B. The protective housing 162 expediently fully encloses the isolating switch 161. It would be possible, as shown in FIG. 13, for the protective housing 162 to be open on its upper surface, so that air is able to reach the isolating switch 161. However, the protective housing 163 is preferably completely sealed, so that the isolating switch 161 can respond particularly sensitively and rapidly to temperature changes, in particular excessively high temperatures.

The protective housing 162 delimits, by way of example, a receptacle 164, for example a chamber, in which the isolating switch 161 is arranged. The housing parts 163A, 163B are, by way of example, interlocked, for which snap contours 165 are present.

The housing part 163B forms a thermal insulator, which protects the isolating switch 161 from external heat influence on the drive motor 100, so that isolating switch 161 is not abnormally operated due to such heat influence.

Conversely, the housing part 163A is thermally conductive so that heat coming from the stator 110 can operate the isolating switch 161. An advantageous measure is represented by a heatsink 169 being arranged in addition, by way of example what is known as a heat conduction pad, which conducts the heat from the stator 110 in the direction of the protective housing 162 and consequently, as far as the isolating switch 161.

The heatsink 169 preferably has a geometry and a surface area, which correspond with the geometry and surface area of a front face of the protective housing facing towards the stator 110.

The heatsink 169 also smoothes out unevennesses of the protective housing 162 and/or the stator 110, which advantageously improves the heat transmission from stator 110 to isolating switch 161.

A further advantageous measure provides that a spring 168, thus a spring arrangement, is provided in order to load the isolating switch 161 in the direction of the stator 110. The spring 168 is, by way of example, arranged on the housing part 163B, in particular its front wall.

Laterally on the protective housing 162, conductor openings 166 are provided for a section L1A of the conductor L1 and section L1B connected with the connection 122.

The isolating switch 161 advantageously also has a housing 161B enclosing this, in which its electromechanical components, in particular a bimetal strip 161C, electrical contacts and similar are housed with electrical insulation. The housing 161B is preferably dust-tight. The housing 161B has, by way of example, electrical contacts for connecting the conductor sections L1A and L1B. Under the effects of heat or cold, the bimetal strip 161C moves back and forth between the positions shown schematically in FIG. 10, wherein it makes or breaks an electrical connection.

If the isolating switch 161 moves into its isolating position, no further current flows through the conductors L1. The current monitoring device 171 of the excitation device 40 is able to detect this and report it to the controller 170. The controller 170 then switches off the excitation device 40 completely, such that no further current flows via the conductors L1-L3. Consequently, the controller 170 detects decentrally, so to speak, a fault on the drive motor 100. As a safety measure, only the isolating switch 161 is needed there. In this way, by way of example, data transmission lines are spared, which would otherwise have to be run from the machining head 11 via the handle element 12 to the controller 140. The controller 170 preferably works with sensors, e.g. without rotation angle information coming from the drive motor 100 from a rotation angle sensor arranged there.

Obviously, it is essentially possible for, by way of example, a rotation angle sensor 174 to be arranged on the drive motor 100, which detects the respective rotation angle position or speed of the rotor 101 and reports this via a data line 176, preferably running in the handle element 12 (shown schematically in FIG. 13), to the controller 170. In this way, it is also possible for the controller 170 to evaluate a respective rotation angle position of the rotor 101 and on the basis of this at least one piece of rotation angle information to excite the exciter coil arrangement.

Obviously, other or further isolating switches may be advantageous on the drive motor 100, thus, for example a power switch 175 detecting a current flow on the conductor L2, which in the event of a current flow above a predetermined value isolates the conductor L2 from the phase P2. It would be perfectly possible for the power switch 175 to be arranged in series with the isolating switch 161, by way of example on the conductor L1.

In the exemplary embodiment according to FIGS. 1-15, the grip rod or the handle element 12 is in a single part, meaning that, by way of example, even the component parts of the channel body 33, 36 can be an overall continuous tubular body.

Figure 16:
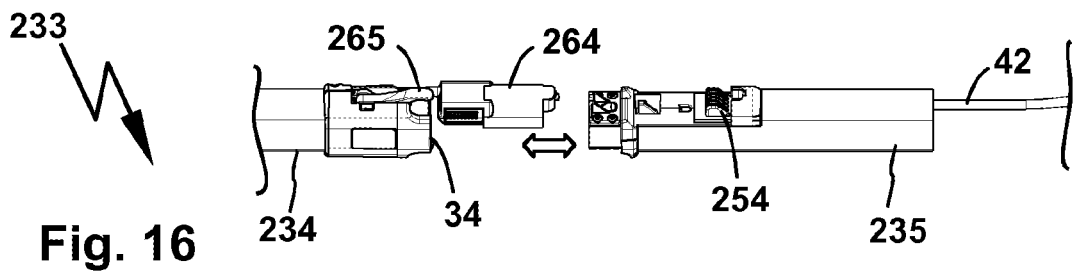
FIG. 16 Grip rod parts of a grip rod for the sanding machine in an as-yet unconnected state, in a perspective view obliquely from above.
Figure 17:
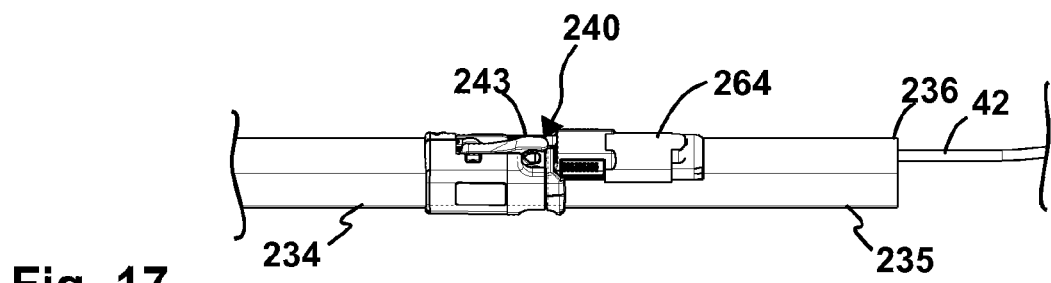
FIG. 17 The arrangement according to FIG. 16, but in the connected state.
Figure 18:
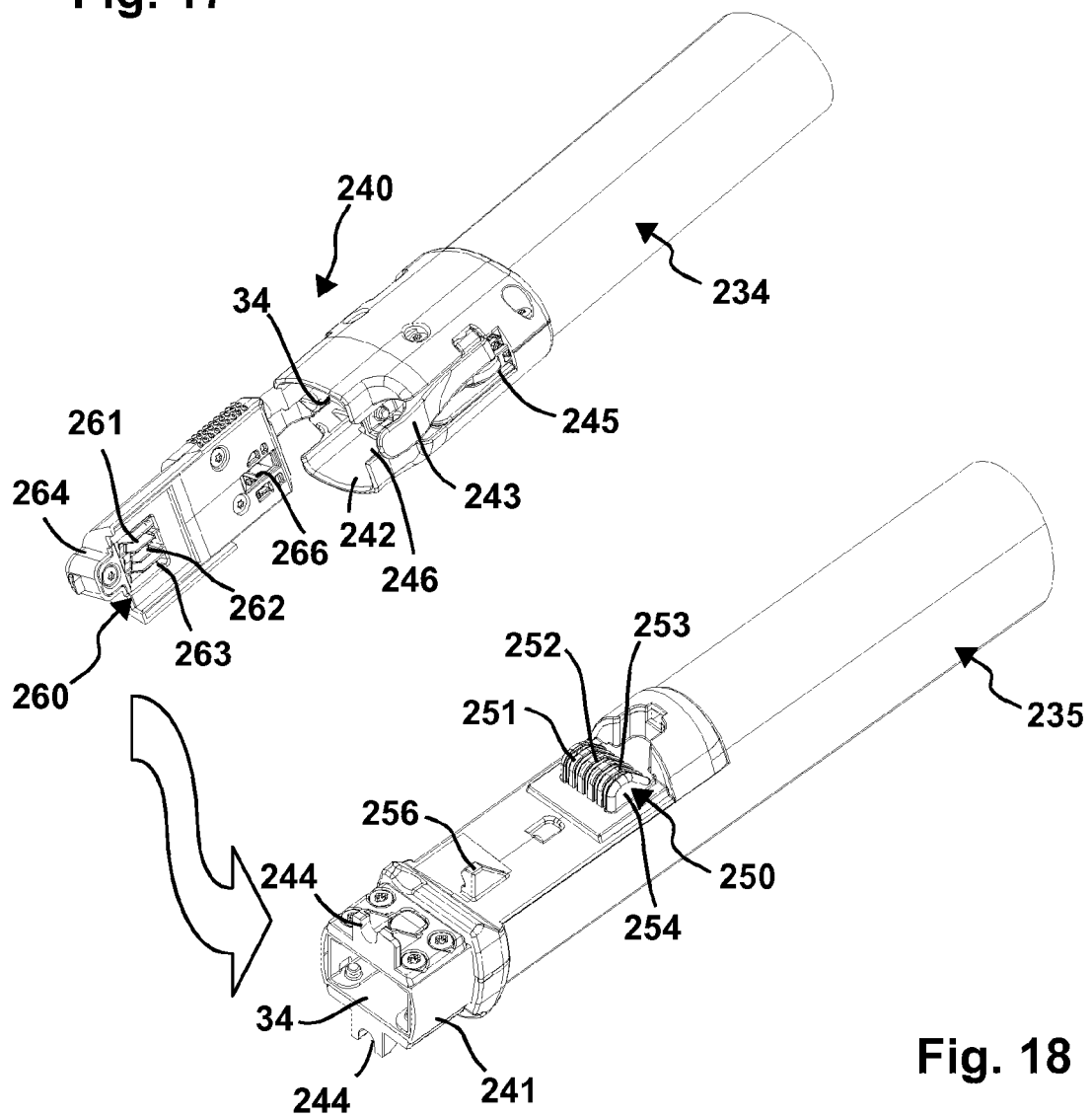
FIG. 18 Perspective detailed views of the grip rod parts shown in FIGS. 16 and 17.

But a multi-part handle element is also perfectly possible, as is clear from FIGS. 16-18. By way of example, instead of the channel body 33, a two-part channel body 233 can be provided. The channel body 233 has, by way of example, segments 234, 235. The segments 234, 235 can, by way of example, be separated from one another (FIG. 16).

The flow channel 34 passes through the segments 234, 235.

On an end region 236 of the segment 35, by way of example, the cable 42 is led out of the channel body 233.

The cable 42 comprises the conductors L1-L3, that is to say a total of three current-carrying conductors, leading along the channel body 233 as far as the excitation device 40 and which can be detachably connected to one another at the separation point between the segments 234 and 235.

The segments 234, 235 can be detachably connected to one another, so that they can be brought together from the separated position shown in FIG. 16 to a connected position shown in FIG. 17. A connection device 240 serves for detachable connection of the segments 234, 235. The connection device 240 comprises, by way of example, a connection projection 241 provided on segment 235, which, by way of example, can be butt-jointed with a connection projection 242 on segment 234. This results in a continuous flow channel 34. The flow channel 34 passes through the socket projection 241 and the socket opening 242.

Alternatively, or additionally, a plug connection is also possible, meaning that, by way of example, the connection projection 241 has a socket projection and the connection projection 242 a socket opening, which can be plugged together.

The connection device 240 further comprises support means in the form of retainers 243 movably supported on the segment 234, which can be brought into engagement with retaining recesses or retaining projections 244 on the segment 235. The retainers 243 are, by way of example supported on pivot bearings 245, such that they can be pivoted away from the retaining projections 244 and, consequently, out of engagement with these.

It is preferred if the retaining projections 244 are able to engage in recesses or other retaining recesses on the segment 234. This results in an additional form fit between the segments 234, 235.

Electrical contact arrangements 250, 260 which can be detachably connected to one another provide the electrical connection between the segments 234, 235. The contact arrangement 250 comprises, by way of example, contacts 251, 252, 253, associated with and connected to the conductors L1-L3. By way of example, the contacts 251-253 are arranged on a contact carrier 254, in particular in indentations, or otherwise mechanically protected. The contact carrier 254, by way of example, is designed as a projection or like a comb.

The contact arrangement 260 comprises corresponding contacts 261-263, which are similarly associated with the lines or conductors L1-L3. The contact arrangement 260 is arranged on a contact carrier 264, which is supported by means of a pivot bearing 265 so that it can pivot on segment 234. By way of example, the contact carrier 264 forms a single piece with the retainer 243 of the segment 234 as a single piece or is movably coupled thereto. Consequently, the contacts 261-263 can be swiveled away from or towards the contacts 251-254 for electrical isolation from or connection to this.

For additional security of this connection between segments 234, 235 or contacts 261-263, a retaining recess 266 on the contact carrier 264 can be brought into engagement with a retaining projection 256 on the segment 235.

The connection between the segments 234 and 235 can be secured through additional catch means, screw means or similar.

In this regard, the advantage will be recognised of the safety concept that involves the protective circuit 160 and the isolating switch 161, because the contact arrangements 250 and 260 need a total of just 3 contact pairs, namely for conductors L1, L2 and L3.

According to a concept that is not just advantageous for the specific exemplary embodiment, it is provided that an inlet opening for a cooling air flow and machining side BS having a tool holder (in the present case 19) are arranged on opposing sides, in particular front faces, of a motor housing (here 25) or of a machine housing.

An outflow direction for the cooling air flow K runs expediently perpendicularly to the machining plane E.

The invention claimed is:

1. A hand-held machine tool having a rod-shaped handle element for an operator to grasp and having a machining head which is movably mounted on the handle element by means of a joint assembly and which has an electric drive motor for driving a tool holder for holding a machining tool, wherein a bottom side of the handle element and a machining side of the machining head face a workpiece in a base position of the machining head, wherein the joint assembly is connected to the machining head in an articulated-connection region of the machining head, wherein a flexible suction hose for conducting a suction flow from the machining head to the handle element extends between the handle element and the machining head, which suction hose is fastened to an end region of the handle element by means of a first hose end and to a suction connection of the machining head by means of a second hose end, and wherein the suction connection is arranged between the end region of the handle element and the articulated-connection region of the machining head in the base position, and
   wherein the joint assembly has a first pivot axis and a second pivot axis, the second pivot axis being at a right angle to the first pivot axis, and
   wherein the handle element has a longitudinal axis extending along a longitudinal extension of the handle element, the longitudinal axis of the handle element being at a right angle to the first pivot axis and arranged on a common plane with the second pivot axis,
   wherein a longitudinal axis of the first hose end of the suction hose extending approximately in the direction of flow of the suction flow is aligned with the longitudinal axis of the handle element such that the first hose end of the suction hose extends at a right angle to the first pivot axis is arranged on the common plane with the second pivot axis, and
   wherein the longitudinal axis of the handle element intersects the first pivot axis, and
   wherein the suction hose has two opposing curved sections between the handle element and the suction connection of the machining head in the base position.

2. The hand-held machine tool according to claim 1, wherein the suction hose runs, protected at least in sections, next to a support arm forming a component of the joint assembly, which protrudes from the handle element and on which the machining head is held.

3. The hand-held machine tool according to claim 2, wherein the support arm comprises a fork on the end region of the handle element holding the machining head, the fork having fork arms, on which the machining head is held and between which or next to which the suction hose runs.

4. The hand-held machine tool according to claim 3, wherein opposing sections of the suction hose protrude laterally in front of the support arm or the fork arms in the base position.

5. The hand-held machine tool according to claim 1, wherein the base position forms a component of a basic working area, wherein the machining head is able to pivot relative to the handle element about at least one pivot axis through an angular range of 15-30° on at least one side of the base position.

6. The hand-held machine tool according to claim 1, wherein the suction hose is immobilised on the end region of the handle element and/or on the suction connection in a tensile-resistant and/or slip-resistant manner.

7. The hand-held machine tool according to claim 1, wherein the suction hose is rotatably supported or immovably secured on the end region of the handle element and/or to the suction connection.

8. The hand-held machine tool according to claim 1, wherein the articulated-connection region of the machining head is provided between the suction connection and the drive motor.

9. The hand-held machine tool according to claim 1, wherein the suction connection is arranged in an edge region or outer circumferential region of an extraction hood of the machining head.

10. The hand-held machine tool according to claim 1, wherein the handle element has at least one suction channel running in a rigid tubular body suitable for gripping the handle element, running in the direction of the longitudinal axis of the handle element and opening out at its end region of the handle element facing towards the machining head on a front face from the handle element.

11. The hand-held machine tool according to claim 1, wherein the joint assembly comprises or is formed by a sliding bearing for linear adjustment of the machining head relative to the handle element and/or a pivot bearing arrangement, wherein the machining head by means of the pivot bearing arrangement is supported so that it can pivot relative to the handle element about at least one pivot axis.

12. The hand-held machine tool according to claim 1, wherein the machining head is loaded by a positioning spring arrangement separate from the suction hose relative to the handle element in the base position.

13. The hand-held machine tool according to claim 12, wherein the positioning spring arrangement comprises a first positioning spring and a second positioning spring, which impinge on the machining head in opposite directions and/or on opposite sides and/or in an opposing direction of rotation in the direction of the base position.

14. The hand-held machine tool according to claim 12, wherein the positioning spring arrangement comprises at least one positioning spring, which is supported directly on bearing elements of the joint assembly.

15. The hand-held machine tool according to claim 12, wherein at least one positioning spring of the positioning spring arrangement is arranged on an inner periphery or an outer periphery of a bearing shaft part, or is passed through by the bearing shaft part and/or extends in a circular manner about at least one pivot axis of the joint assembly.

16. The hand-held machine tool according to claim 12, wherein at least one positioning spring of the positioning spring arrangement is enclosed at least in part or completely in a bearing housing of a bearing element of the joint assembly.

17. The hand-held machine tool according to claim 1, wherein the motor is attached to the machine head.

18. The hand-held machine tool according to claim 1, wherein the motor and the handle element are on opposite sides of the articulated region of the machining head.

* * * * *